(12) United States Patent
Morita

(10) Patent No.: US 8,509,227 B2
(45) Date of Patent: Aug. 13, 2013

(54) DATA ANALYSIS APPARATUS AND DATA ANALYSIS METHOD

(75) Inventor: Teruyuki Morita, Kyoto (JP)

(73) Assignee: Panasonic Corporation, Osaka (JP)

(*) Notice: Subject to any disclaimer, the term of this patent is extended or adjusted under 35 U.S.C. 154(b) by 1531 days.

(21) Appl. No.: 11/711,896

(22) Filed: Feb. 28, 2007

(65) Prior Publication Data

US 2007/0201463 A1 Aug. 30, 2007

(30) Foreign Application Priority Data

Feb. 28, 2006 (JP) .................. 2006-051730
Feb. 13, 2007 (JP) .................. 2007-032320

(51) Int. Cl.
*H04L 12/28* (2006.01)
*H04L 12/56* (2011.01)
*H04N 11/02* (2006.01)
*H04N 11/04* (2006.01)
*H04N 7/12* (2006.01)

(52) U.S. Cl.
USPC ...... 370/389; 370/392; 370/412; 375/240.27; 375/240.12

(58) Field of Classification Search
USPC ..................... 370/389; 375/240.27
See application file for complete search history.

(56) References Cited

U.S. PATENT DOCUMENTS

| | | | | |
|---|---|---|---|---|
| 6,141,385 A | * | 10/2000 | Yamaji | 375/240.27 |
| 6,567,484 B1 | * | 5/2003 | Hirota et al. | 375/355 |
| 2002/0122493 A1 | * | 9/2002 | Lin | 375/240.27 |
| 2005/0171763 A1 | * | 8/2005 | Zhou et al. | 704/201 |
| 2006/0036389 A1 | * | 2/2006 | Ozora et al. | 702/108 |
| 2006/0067345 A1 | * | 3/2006 | Hayashi et al. | 370/412 |

FOREIGN PATENT DOCUMENTS

JP 2000-40311 A 2/2000
JP 2002-171250 A 6/2002

OTHER PUBLICATIONS

Japanese Office Action issued in Japanese Patent Application No. JP 2007-032320 dated Jan. 18, 2011.

* cited by examiner

*Primary Examiner* — Hassan Phillips
*Assistant Examiner* — Lonnie Sweet
(74) *Attorney, Agent, or Firm* — McDermott Will & Emery LLP

(57) ABSTRACT

A unique pattern detection unit conducts a search for a unique pattern in a forward direction of a program stream, and detects a pseudo unique pattern PUP included in encoded data. A header information extraction unit sets extraction starting position information indicating a head of pseudo header information following the extracted pseudo unique pattern UP0 to an extraction starting position storing unit. The header information extraction unit extracts pseudo header information HD0 following the pseudo unique pattern PUP, and an error checking unit conducts error check on the pseudo header information PHD. If any error is detected from the pseudo header information PHD, the unique pattern detection unit resumes the search for the unique pattern from the position indicated by the extraction starting position information stored in the extraction starting position storing unit.

5 Claims, 13 Drawing Sheets

FIG. 8
UNIQUE PATTERN : 00-00-01-ID
EXTRACTION HEADER INFORMATION (5 BYTES)
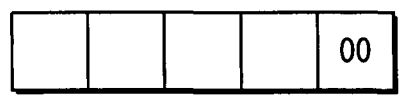 UNIQUE PATTERN DETECTION STATUS (1)
 UNIQUE PATTERN DETECTION STATUS (2)
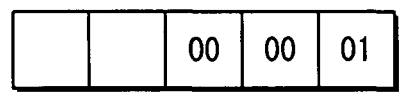 UNIQUE PATTERN DETECTION STATUS (3)

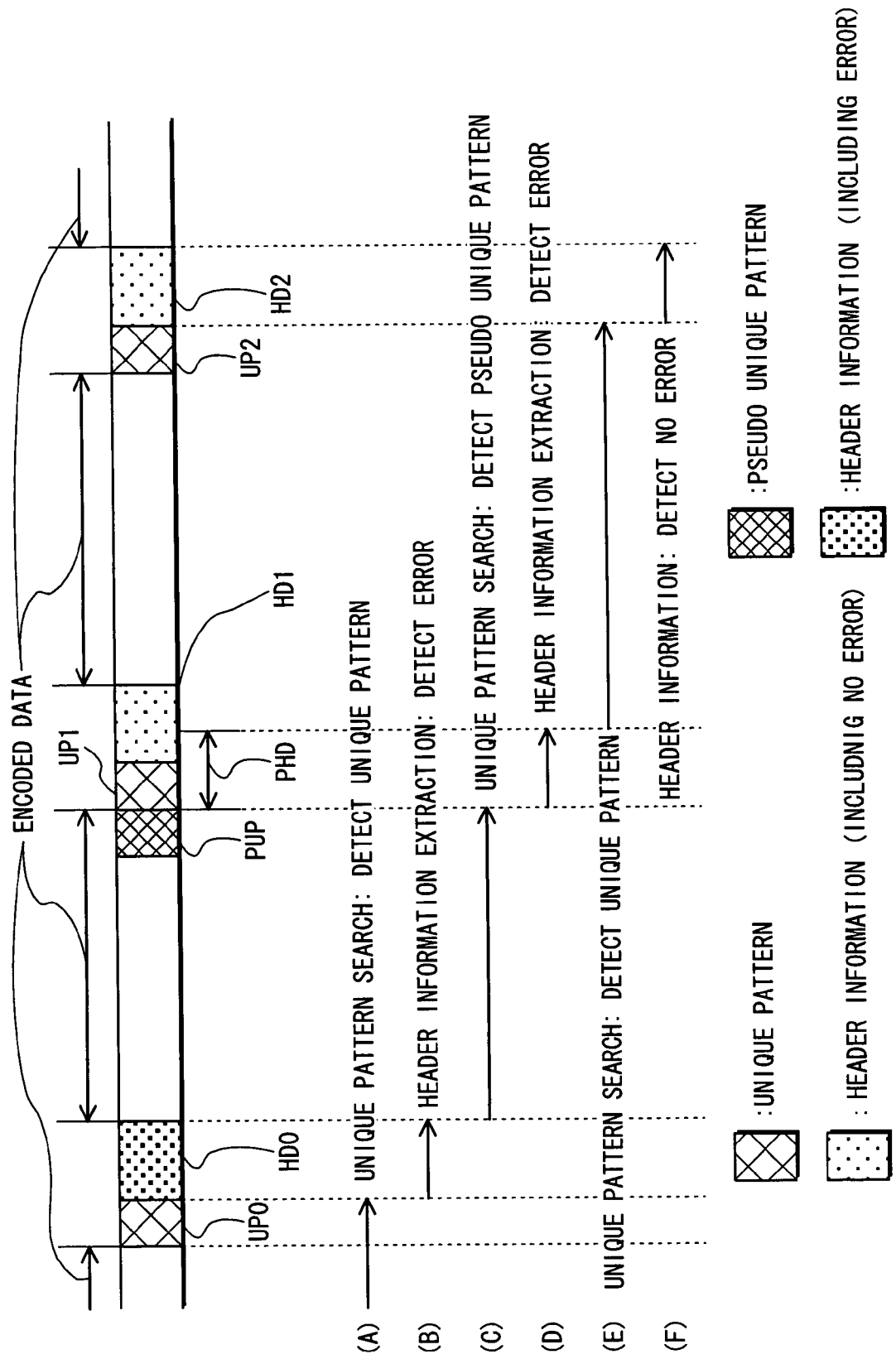

DATA ANALYSIS APPARATUS AND DATA ANALYSIS METHOD

BACKGROUND OF THE INVENTION (1) Field of the Invention

The present invention relates to a technique for demultiplexing multiplexed data to pieces of encoded data. In the multiplexed data, a plurality of types of encoded data are multiplexed, for example.

(2) Description of the Related Art

In recent years, digital apparatuses that play back audio, video and additional information such as subtitles have been widely used. As common in DVDs (Digital Versatile Disks), digital broadcast system and so on, the audio data, the video data and the additional information data are digital-encoded and multiplexed. The digital apparatuses receive the multiplexed data via wires or wirelessly, and demultiplexes the multiplexed data to play back audio, video and additional information.

Generally, for encoding video data, the encoding method defined by the MPEG (Moving Picture Expert Group) standard is used. For encoding audio data, other encoding method may be adopted as well as the encoding method defined by the MPEG standard.

For multiplexing audio encoded data, video encoded data and encoded additional information data, the multiplex system defined by the system standard of the MPEG is generally used.

With the digital apparatuses described above, an error might be mixed in the multiplexed data during the encoding or transmission through a transmission path. Therefore, there is a demand for a digital apparatus that can smoothly play back images, sounds, etc. of such deteriorated multiplexed data.

Firstly, for explaining a conventional art attempting to fulfill the above demand, an example of a schematic structure of multiplexed data to be accumulated is shown in FIG. 12. In this example, the data is multiplexed in accordance with the multiplex system defined by the system standard of the MPEG.

A PES (Packetized Elementary Stream) illustrated in FIG. 12 is a variable-length packet divided from an ES (elementary Stream) so as to have a certain length and packetized. The PES includes a PES header and a PES payload.

The PES header includes a packet start code at the head thereof, which includes a packet start code prefix as a fixed value and a stream ID (identifier) representing a stream type (video, audio, additional information, etc.). The packet start code indicates the head of the PES. The PES header also includes PES header information, which follows the packet start code. The PES header information includes, for example, information representing a PES packet length and PES header data length, a flag, and control information.

The control information includes, for example, time stamp information which designates a playback start time of encoded data to be inserted in the PES payload. As the time stamp information, two types are defined. One is a PTS (Presentation Time Stamp) which indicates a presentation time, and the other is a DTS (Decoding Time Stamp) which indicates a decoding time.

A pack illustrated in FIG. 12 includes the pack header and the PES. The pack header includes a pack start code at the head thereof, which is a unique data sequence. The pack start code indicates the head of the pack. The pack header also includes pack header information, which follows the pack start code. The pack header information includes, for example, an SCR (System Clock Reference) and rate (speed) information.

A PS (program stream) illustrated in FIG. 12 includes a plurality of the packs.

Next, the conventional art attempting to fulfill the demand above is described. Note that each of the pack start code indicating the head of the pack and the packet start code indicating the head of the PES is a unique sequence of values. Such a sequence is hereinafter called the "unique pattern".

A search for the unique pattern is conducted in the forward direction of the program stream.

If a pattern data sequence that is the same as the unique pattern is found by the search, header information is extracted from a data sequence that follows the found pattern data sequence (hereinafter called a "pattern subsequent data sequence") and whether any error is included in the extracted header information (hereinafter called "extraction header information") is judged. If any error is detected in the extraction header information, skip-reading of data based on the header length and the packet length is not performed. Instead, the search for the unique pattern is resumed from the head of a data sequence (hereinafter called "header subsequent data sequence") that follows the extraction header information in the forward direction of the program stream (e.g. Japanese Laid-open Patent Application Publication No. 2000-40311).

The following explains problems of the above-described conventional art, with reference to FIG. 13. FIG. 13 is a drawing for explaining the problems of the conventional art.

(A) A digital apparatus searches for the unique pattern in the forward direction of the program stream, and detects a pattern data sequence (a unique pattern UP0) that is the same as the unique pattern.

(B) The Digital apparatus extracts header information HD0 from a pattern subsequent data sequence following the detected unique pattern UP0. The digital apparatus judges whether any error is included in the header information HD0, and detects an error of the header information HD0.

(C) The digital apparatus conducts a search for the unique pattern in the forward direction of the program stream from a position of the head of a header subsequent data sequence following the header information HD0, and detects a pattern data sequence (a pseudo unique pattern PUP) that is the same as the unique pattern included in the encoded data.

(D) The digital apparatus extracts pseudo header information PHD as the header information from a pattern subsequent data sequence following the detected pseudo unique pattern PUP, and judges whether any error is included in the pseudo header information PHD. The pseudo unique pattern PUP is a data sequence in encoded data, but not the genuine unique pattern. Also, the pseudo header information PHD extracted from the pattern subsequent data sequence following the pseudo unique pattern PUP is not the genuine header information. For this reason, the digital apparatus detects an error of the pseudo header information PHD.

(E) The digital apparatus conducts a search for the unique pattern in the forward direction of the program stream from a position of the head of a header subsequent data sequence following the pseudo header information PHD, and detects a pattern data sequence (a unique pattern UP2) that is the same as the unique pattern.

The unique pattern UP2 is a genuine unique pattern.

(F) The digital apparatus extracts header information HD2 from a pattern subsequent data sequence following the detected unique pattern UP2. The digital apparatus judges whether any error is included in the header information HD2, and does not detect an error of the header information.

In the example of FIG. 13, the program stream includes the genuine unique pattern UP1 and the header information HD1 that includes no error. However, since the search for the unique pattern is resumed from the position of the head of the header subsequent data sequence following the pseudo header information PHD, the unique pattern UP1 is undetectable.

Thus, if at least part of the genuine unique pattern is included in the pseudo header information, the digital apparatus of the conventional art can not detects the genuine unique pattern. For this reason, the digital apparatus can not perform reproduction of the encoded data inserted in the PES payload following the genuine unique pattern and the header information that includes no error. This causes some problems. Regarding audio reproduction for example, the sound often jumps, silence continues for a long time, and so on.

SUMMARY OF THE INVENTION

The object of the present invention is to provide a data analysis apparatus and a data analysis method of which ability of the detection of the unique pattern is improved so that if any error is mixed in multiplexed data through a transmission path or during encoding, or if part of the multiplexed data is absent, the reproduction of the data can be immediately resumed.

To achieve the above object, the present invention provides a data analysis apparatus comprising: a unique pattern detection unit operable to conduct a search for a pattern data sequence in a forward direction of a data sequence constituted of successive data blocks each including a unique pattern, header information following the unique pattern and a data body following the header information, the pattern data sequence being the same as the unique pattern; an extraction unit operable to extract header information from a subsequent data sequence following the pattern data sequence detected by the search; an extraction starting position storing unit operable to store extraction starting position information indicating a position of a head of the subsequent data sequence; an error checking unit operable to conduct an error check on extraction header information that is the header information extracted by the extraction unit; and a control unit operable, if any error is detected from the extraction header information by the error checking unit, to cause the unique pattern detection unit to resume the search for the pattern data sequence from the position indicated by the extraction starting position information.

To achieve the above object, the present invention provides a data analysis method comprising: a search step of conducting a search for a pattern data sequence in a forward direction of a data sequence constituted of successive data blocks each including a unique pattern, header information following the unique pattern and a data body following the header information, the pattern data sequence being the same as the unique pattern; an extraction step of extracting header information from a subsequent data sequence following the pattern data sequence detected by the search; an extraction starting position storing step of storing extraction starting position information indicating a position of a head of the subsequent data sequence; an error checking step of conducting an error check on extraction header information that is the header information extracted in the extraction step; and a control step of, if any error is detected from the extraction header information in the error checking step, resuming the search in the search step for the pattern data sequence from the position indicated by the extraction starting position information.

With each of the data analysis apparatus and the data analysis method stated above, if any error is detected from the extraction header information, the unique pattern detection unit resumes the search for the unique pattern from the head of the subsequent data sequence following the pattern data sequence that is the same as the detected unique pattern. Accordingly, it is possible to detect a unique pattern included in the extraction header information from which an error has been detected, and this improves the ability of the detection of the unique pattern.

The stated data analysis apparatus may further comprise: a status storing unit operable to store a pre-recovery status information indicating that a current period is a pre-recovery period that is from when an error is detected from a certain extraction header information by the error checking unit until when no error is detected from other header information following the certain extraction header information; and an information judging unit operable to judge whether prescribed information is included in the extraction header information, wherein only if the status storing unit does not store the pre-recovery status information or if the status storing unit stores the pre-recovery status information and the information judging unit has judged affirmatively, the error checking unit may conduct the error check on the extraction header information, and only if the error checking unit has detected any error from the extraction header information or if the status storing unit stores the pre-recovery status information and the information judging unit has judged negatively, the control unit may cause the unique pattern detection unit to resume the search for the pattern data sequence that is the same as the unique pattern from the position indicated by the extraction starting position information.

For example, in the case where the subject data is a program stream and a transport stream in conformity with the MPEG standard and the prescribed information is the presentation time information (PTS), if the extraction header information does not include the presentation time information (PTS), it is impossible to resume reproduction of video and audio based on the program stream or the transport stream even if no error is included in the extraction header information. In the other words, once an error is detected from certain extraction header information, it is unnecessary to conduct the error check on the extraction header information until other extraction header information, including the presentation time information and no error, is detected.

With the data analysis apparatus described above, in the case where the data analysis apparatus is in such a status that the pre-recovery status information is stored in the status storing unit, the error check on the extraction header information is performed only if the extraction header information includes the presentation time information. Therefore, delay of the resume of the reproduction of audio, video and so on is prevented, and load of processing for the error check on the extraction header information is reduced.

The present invention provides a data analysis apparatus comprising: a unique pattern detection unit operable to conduct a search for a pattern data sequence in a forward direction of a data sequence constituted of successive data blocks each including a unique pattern, header information following the unique pattern and a data body following the header information, the pattern data sequence being the same as the unique pattern;

an extraction unit operable to extract header information from a subsequent data sequence following the pattern data sequence; an error checking unit operable to conduct an error check on extraction header information that is the header information extracted by the extraction unit; an analysis unit operable to analyze the extraction header information if the error checking unit has detected any error from the extraction header information; a first control unit operable, if the extraction header information includes the pattern data sequence that is the same as the unique pattern, to cause the extraction unit to extract header information from a first subsequent data sequence following the pattern data sequence included in the extraction header information and a second subsequent data sequence following the extraction header information extracted by the extraction unit; and a second control unit operable, if an end portion of the extraction header information is the same as a part of the unique pattern, to cause the unique pattern detection unit to conduct the search on the end portion and the second subsequent data sequence.

The present invention provides a data analysis method comprising: a search step of conducting a search for a pattern data sequence in a forward direction of a data sequence constituted of successive data blocks each including a unique pattern, header information following the unique pattern and a data body following the header information, the pattern data sequence being the same as the unique pattern; an extraction step of extracting header information from a subsequent data sequence following the pattern data sequence; an error checking step of conducting an error check on extraction header information that is the header information extracted in the extraction step; an analysis step of analyzing the extraction header information if any error has been detected from the extraction header information in the error checking step; a first control step of, if the extraction header information includes the pattern data sequence that is the same as the unique pattern, extracting, in the extraction step, header information from a first subsequent data sequence following the pattern data sequence included in the extraction header information and a second subsequent data sequence following the extraction header information extracted in the extraction step; and a second control step of, if an end portion of the extraction header information is the same as a part of the unique pattern, conducting the search in the search step on the end portion and the second subsequent data sequence.

With each of the data analysis apparatus and the data analysis method stated above, if any error is detected from the extraction header information, the extraction header information is analyzed to check whether the pattern data sequence that is the same as the unique pattern is included in the extraction header information. Also, the extraction header information is analyzed to check whether the end portion of the extraction header information that is the same as part of the unique pattern, and the end portion of the extraction header that is the same as the part of the unique pattern is used for the search for the unique pattern. As a result, it is possible to detect a unique pattern all or part of which is included in the extraction header information from which an error has been detected, and this improves the ability of the detection of the unique pattern.

The stated data analysis apparatus may further comprise: a status storing unit operable to store a pre-recovery status information indicating that a current period is a pre-recovery period that is from when an error is detected from a certain extraction header information by the error checking unit until when no error is detected from other header information; and an information judging unit operable to judge whether prescribed information is included in the extraction header information, wherein only if the status storing unit does not store the pre-recovery status information or if the status storing unit stores the pre-recovery status information and the information judging unit has judged affirmatively, the error checking unit may conduct the error check on the extraction header information, and only if the error checking unit has detected any error from the extraction header information or if the status storing unit stores the pre-recovery status information and the information judging unit has judged negatively, the analysis unit may analyze the extraction header information.

With the data analysis apparatus described above, in the case where the data analysis apparatus is in such a status that the pre-recovery status information is stored in the status storing unit, the error check on the extraction header information is performed only if the extraction header information includes the presentation time information. Therefore, delay of the resume of the reproduction of audio, video and so on is prevented, and load of processing for the error check on the extraction header information is reduced.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 8 explains unique pattern detection statuses;

FIG. 13 explains problems of the conventional art.

DESCRIPTION OF THE PREFERRED EMBODIMENT

<First Embodiment>

The following describes a demultiplexer (equivalent to a data analysis apparatus) according to a first embodiment of the present invention, with reference to the drawings.

<Structure>

Figure 1:
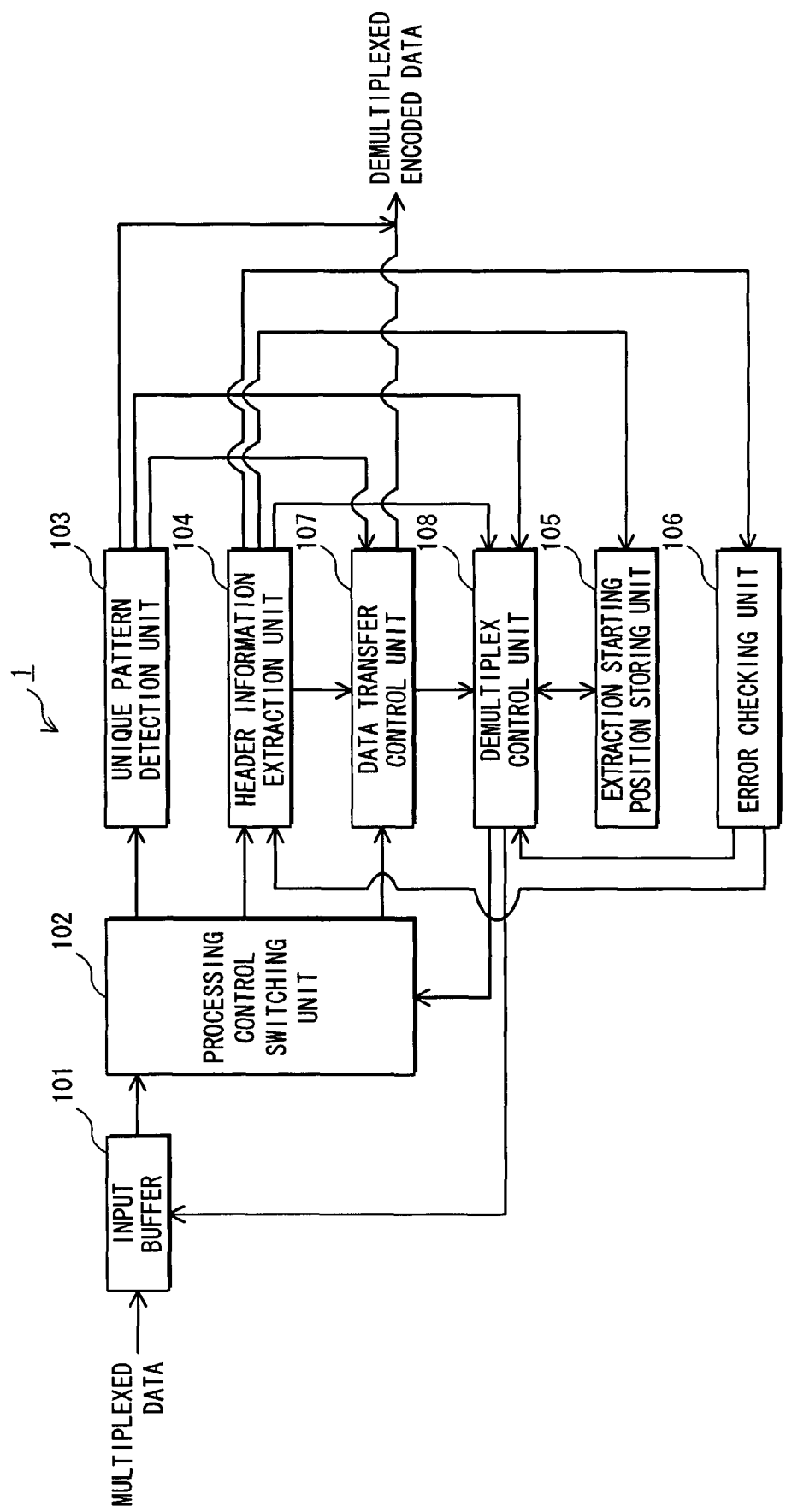
FIG. 1 shows a structure of a demultiplexer according to a first embodiment.

The structure of the demultiplexer of the first embodiment is described with reference to FIG. 1. FIG. 1 shows the structure of the demultiplexer according to the first embodiment.

A demultiplexer 1 includes an input buffer 101, a processing control switching unit 102, a unique pattern detection unit 103, a header information extraction unit 104, an extraction starting position storing unit 105, an error checking unit 106, a data transfer control unit 107, and a demultiplex control unit 108.

Regarding FIG. 1, note that components not directly relating to the present invention are omitted. For example, a host CPU (Central Processing Unit) which controls the demultiplexer 1, a multiplexed data providing unit which provides the input buffer 101 with multiplexed data, an output buffer to which the data transfer control unit 107 outputs audio encoded data, and an output buffer to which the data transfer control unit 107 outputs video encoded data are omitted.

The input buffer 101 is a buffer for an input, which temporarily stores a multiplexed data sequence provided. Note that in the input buffer 101, a read pointer advances according to the output of the data stored in the input buffer 101.

The processing control switching unit 102 performs switching control for connecting the output terminal of the input buffer 101 with any of the input terminal of the unique pattern detection unit 103, the input terminal of the header information extraction unit 104, and the input terminal of the data transfer control unit 107. This switching control is performed according to a unique pattern detection instructing signal, a header information extraction instructing signal, and a data transfer control instructing signal, which are input from the demultiplex control unit 108. These signals are explained later.

Specifically, the processing control switching unit 102 connects the output terminal of the input buffer 101 to the input terminal of the unique pattern detection unit 103 in response to the input of the unique pattern detection instructing signal.

Moreover, the processing control switching unit 102 connects the output terminal of the input buffer 101 to the input terminal of the header information extraction unit 104 in response to the input of the header information extraction instructing signal.

Furthermore, the processing control switching unit 102 connects the output terminal of the input buffer 101 to the input terminal of the data transfer control unit 107 in response to the input of the data transfer control instructing signal.

The unique pattern detection unit 103 sequentially reads pieces of data included in the multiplexed data sequence accumulated in the input buffer 101 while performing search operations for searching for the unique pattern that indicates the head of the pack and the unique pattern that indicates the head of the PES from the read pieces of data.

If the pattern data sequence that is the same as the unique pattern is detected, the unique pattern detection unit 103 outputs a unique pattern detection notifying signal and a pack-PES notifying signal to the demultiplex control unit 108. The unique pattern detection notifying signal is for notifying the demultiplex control unit 108 that the unique pattern is detected. The pack-PES notifying signal is for notifying the demultiplex control unit 108 whether the detected unique pattern relates to the pack or the PES. If the unique pattern relating to the PES is detected, the unique pattern detection unit 103 outputs a PES type notifying signal to the data transfer control unit 107. The PES type notifying signal is for notifying the data transfer control unit 107 of a type (audio, video, additional information, etc.) of the encoded data inserted in the PES payload obtained based on the stream ID included in the unique pattern.

Note that the unique pattern detection unit 103 may be configured to output the data read from the input buffer 101 to a subsequent output buffer (not illustrated). Also, the unique pattern detection unit 103 may be configured to abandon the read data.

The header information extraction unit 104 sequentially reads pieces of data included in the multiplexed data sequence data accumulated in the input buffer 101 while performing extraction operations for extracting the header information (the packet length, the flags, the header length, the presentation time information, etc.) from the read data sequence (the pattern subsequent data sequence).

The header information extraction unit 104 outputs the extracted header information (the extraction header information) to the data transfer control unit 107 while outputting the extraction header information to the error checking unit 106. Also, upon completing the reading of data relating to the header information from the input buffer 101, the header information extraction unit 104 outputs a reading completion notifying signal to the demultiplex control unit 108. The reading completion notifying signal is for notifying the demultiplex control unit 108 that the reading of the header information has been completed.

Note that the header information extraction unit 104 continues the extraction of the header information if the header information extraction unit 104 receives a request for extracting information other than the above, such as decoding time information, from the error checking unit 106.

The header information extraction unit 104 sets extraction starting position information into the extraction starting position storing unit 105. The extraction starting position information indicates a position in the input buffer 101, which is indicated by the read pointer when the header information extraction operation is started. Note that the position in the input buffer 101, indicated by the extraction starting position information, is the position of the data at the head of the pattern subsequent data sequence following the pattern data sequence that is the same as the unique pattern detected by the unique pattern detection unit 103.

The extraction starting position storing unit 105 is a memory for storing the above-mentioned extraction starting position information.

The error checking unit 106 checks whether any error is included in the extraction header information input from the header information extraction unit 104. If an error is detected from the extraction header information, the error checking unit 106 outputs an error detection notifying signal to the demultiplex control unit 108. The error detection notifying signal is for notifying the demultiplex control unit 108 that an error is detected from the extraction header information. Note that such a check may be performed as to other information, such as the decoding time information.

Figure 2:
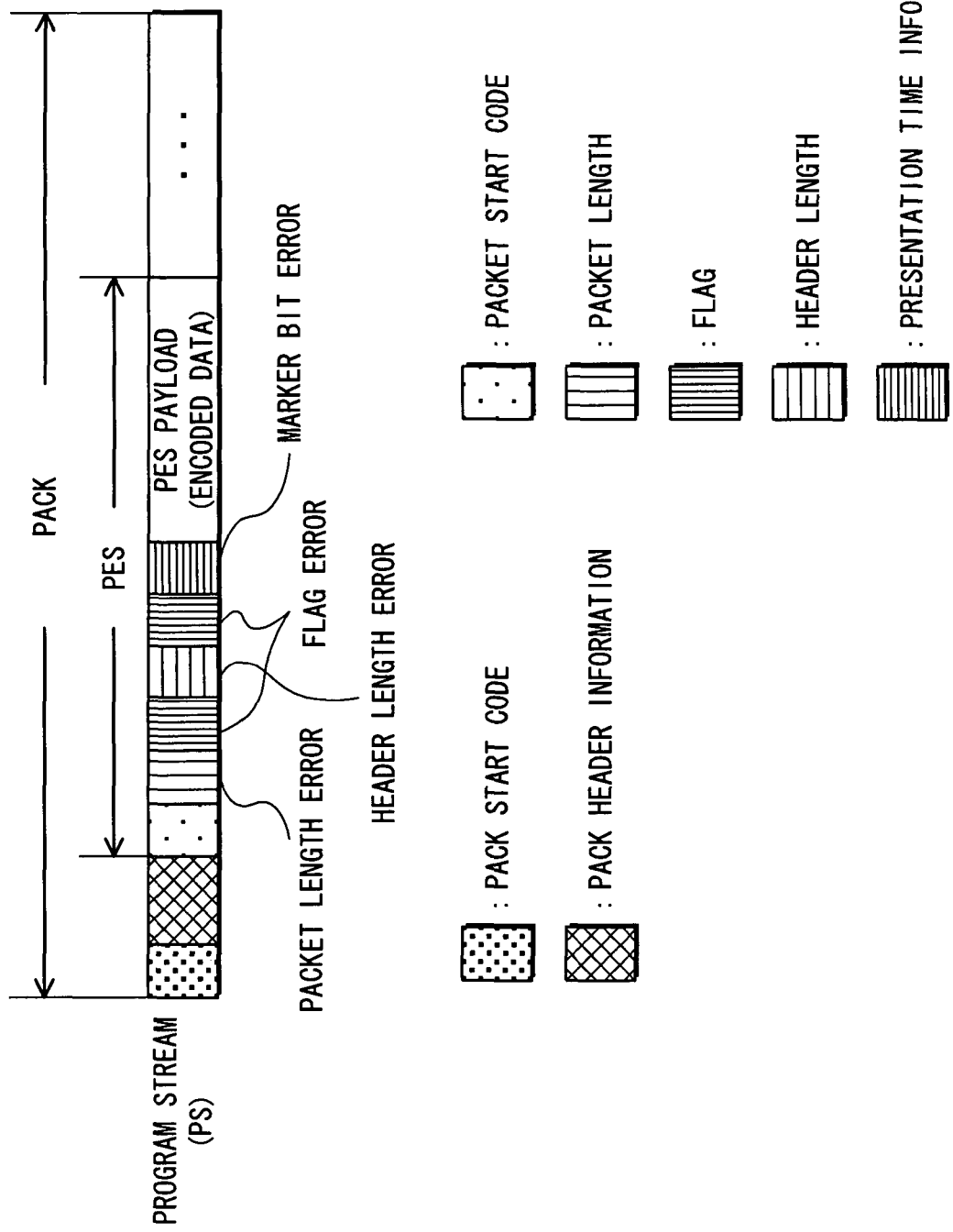
FIG. 2 is a data format diagram showing example locations of errors included in a packet.

FIG. 2 shows example locations of errors included in the program stream. The example of FIG. 2 illustrates a packet length error, a header length error, a flag error, and a marker bit error of the present time information (PTS).

The data transfer control unit 107 sequentially reads pieces of data included in the multiplex data sequence accumulated in the input buffer 101 based on the extraction header information (the packet length, the header length, etc.) input from the header information extraction unit 104. Then, the data transfer control unit 107 performs transmission operation for transmitting the read data (data which constitutes the encoded data) to an output buffer (not illustrated) corresponding to the type (video, audio, additional information, etc.) indicated by a PES type notifying information input from the unique pattern detection unit 103.

Upon completing the transfer of the encoded data to the output buffer, the data transfer control unit 107 outputs a transfer completion notifying signal to the demultiplex control unit 108. The transfer completion notifying signal is for notifying the demultiplex control unit 108 that the transfer of the encoded data has been completed.

If receiving the unique pattern detection notifying signal from the unique pattern detection unit 103, the demultiplex control unit 108 outputs the header information extraction instructing signal to the processing control switching unit 102.

If receiving the error detection notifying signal from the error checking unit 106, the demultiplex control unit 108 outputs the unique pattern detection instructing signal to the processing control switching unit 102. At this time, the demultiplex control unit 108 reads the extraction starting position information from the extraction starting position storing unit 105, and reconfigures the read pointer that indicates the reading position in the input buffer 101 so as to indicate the position in the input buffer 101 indicated by the extraction starting position information. Here, this change is performed under control so that a write pointer which indicates a write position in the input buffer 101 does not overtake the read pointer.

In the case where the pack-PES notifying signal input from the unique pattern detection unit 103 indicates a PES, if the demultiplex control unit 108 receives the reading completion notifying signal from the header information extraction unit 104 without receiving the error detection notifying signal from the error checking unit 106, the demultiplex control unit 108 outputs the data transfer control instructing signal to the processing control switching unit 102.

Moreover, in the case where the pack-PES notifying signal input from the unique pattern detection unit 103 indicates a pack, if the demultiplex control unit 108 receives the reading completion notifying signal from the header information extraction unit 104 without receiving the error detection notifying signal from the error checking unit 106, the demultiplex control unit 108 outputs the unique pattern detection instructing signal to the processing control switching unit 102. In this case, the read pointer position in the input buffer 101 is not to be changed to the position in the input buffer 101 indicated by the extraction starting position information stored in the extraction starting position storing unit 105.

If receiving the transfer completion notifying signal from the data transfer control unit 107, the demultiplex control unit 108 outputs the unique pattern detection instructing signal to the processing control switching unit 102. In this case, the read pointer position in the input buffer 101 is not to be changed to the position in the input buffer 101 indicated by the extraction starting position information stored in the extraction starting position storing unit 105.

<Operations>

Figure 3:
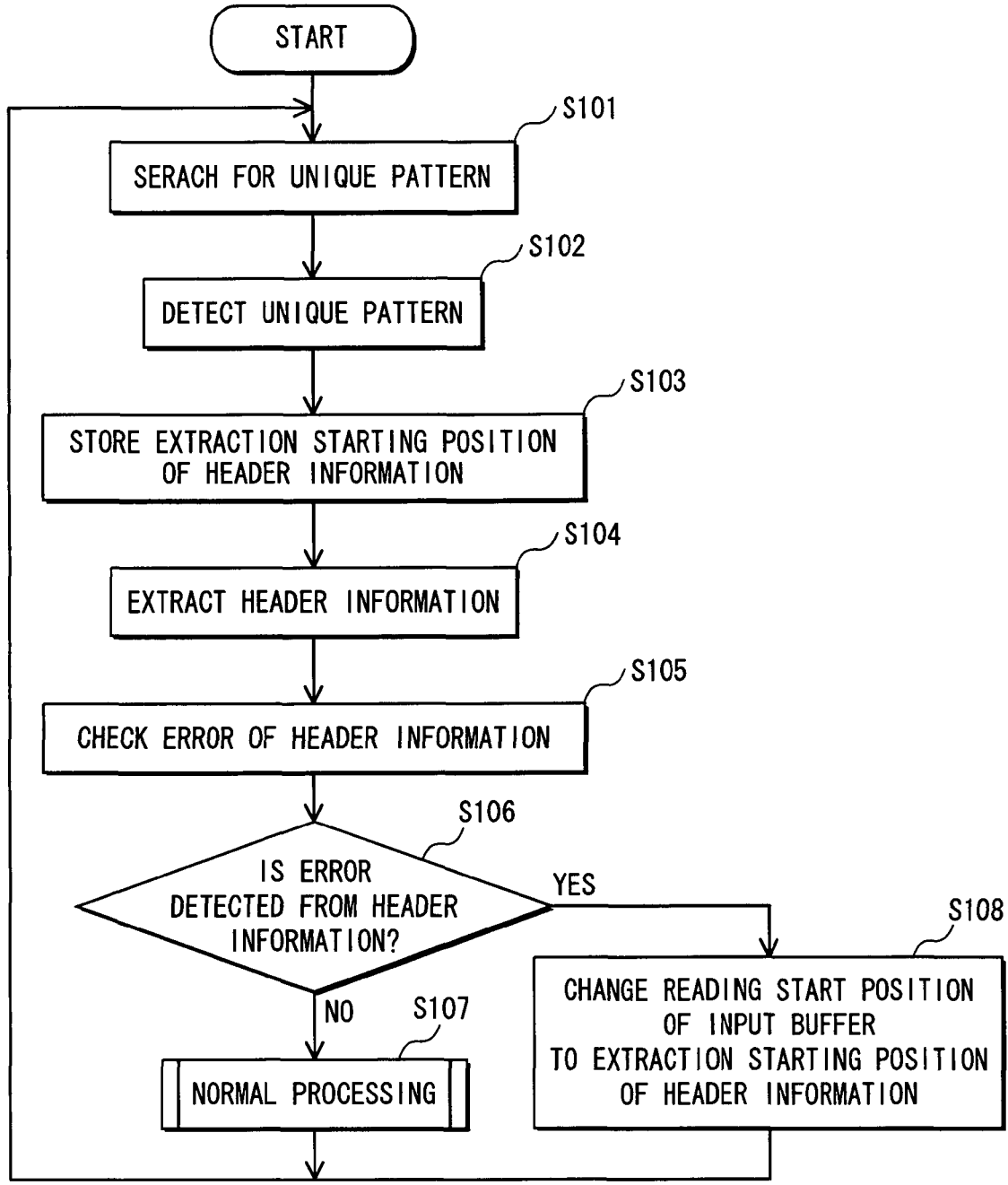
FIG. 3 is a flowchart showing a flow of demultiplexing performed by the demultiplexer of FIG. 1.

The following explains the demultiplexing performed by the demultiplexer 1, whose structure is shown in FIG. 1, with reference to FIG. 3. FIG. 3 is a flowchart showing a flow of the demultiplexing performed by the demultiplexer 1 of FIG. 1.

It is assumed here that the processing control switching unit 102 is currently connecting the output terminal of the input buffer 101 and the input terminal of the unique pattern detection unit 103.

The unique pattern detection unit 103 sequentially reads pieces of data included in the multiplexed data sequence accumulated in the input buffer 101 while performing search operations for searching for the unique pattern from the read data sequence (Step S101).

The unique pattern detection unit 103 detects a unique pattern in the multiplexed data sequence by finding a pattern data sequence that is the same as the unique pattern in the data sequence read by the unique pattern detection unit 103. The unique pattern detection unit 103 outputs the unique pattern detection notifying signal to the demultiplex control unit 108, and the demultiplex control unit 108 outputs the header information extraction instructing signal to the processing control switching unit 102. The processing control switching unit 102 changes the connection destination of the output terminal of the input buffer 101 from the input terminal of the unique pattern detection unit 103 to the input terminal of the header information extraction unit 104 (Step S102).

The header information extraction unit 104 sets extraction starting position information into the extraction starting position storing unit 105. The extraction starting position information indicates a position in the input buffer 101, which is indicated by the read pointer when the header information extraction operation is started (Step S103).

The header information extraction unit 104 sequentially reads pieces of data included in the multiplexed data sequence data accumulated in the input buffer 101 while performing extraction operations for extracting the header information (the packet length, the flags, the header length, the presentation time information, etc.) from the read data sequence (the pattern subsequent data sequence) (Step S104). Upon completing the reading of data relating to the header information from the input buffer 101, the header information extraction unit 104 outputs the reading completion notifying signal to the demultiplex control unit 108.

The error checking unit 106 checks whether any error is included in the extraction header information input from the header information extraction unit 104 (Step S105).

In the error check as to extraction header information performed in Step S105, the error checking unit 106 checks whether any error is detected from the extraction header information (Step S106). If no error is detected from the extraction header information (Step S106: NO), the demultiplexer 1 performs the following usual processing (Step S107). After finishing the normal processing, the processing control switching unit 102 connects the input buffer 101 to the input terminal of the unique pattern detection unit 103. Then, Step S101 and later are performed.

If the detected unique pattern relates to a pack, the demultiplexer 1 performs processing usually performed on a pack, such as processing using the extraction header information.

If the detected unique pattern relates to a PES, the data transfer control unit 107 performs processing usually performed on a PES. For example, the data transfer control unit 107 transfers pieces of data constituting the multiplexed data sequence (i.e. pieces of data constituting the encoded data) accumulated in the input buffer 101 to the subsequent output buffer.

The processing (usual processing shown in Step S107) that is performed in the case where no error is detected from the header information extracted from the pattern subsequent data sequence that follows the detected pattern data sequence that is the same as the unique pattern in the multiplexed data is not described in detail because this is substantially the same processing as in the well-known technique.

If any error is detected from the extraction header information (Step S106: YES), the error checking unit 106 outputs the error detection notifying signal to the demultiplex control unit 108, and the demultiplex control unit 108 outputs the unique pattern detection instructing signal to the processing control switching unit 102.

The processing control switching unit 102 changes the connection destination of the input terminal of the input buffer 101 from the input terminal of the header information extraction unit 104 to the input terminal of the unique pattern detection unit 103. At this time, the demultiplex control unit 108 reads the extraction starting position information from the extraction starting position storing unit 105, and reconfigures the read pointer that indicates the reading position in the input buffer 101 so as to indicate the position in the input buffer 101 indicated by the extraction starting position information (Step S108). Then, Step S101 and later are performed.

Specific Example

Figure 4:
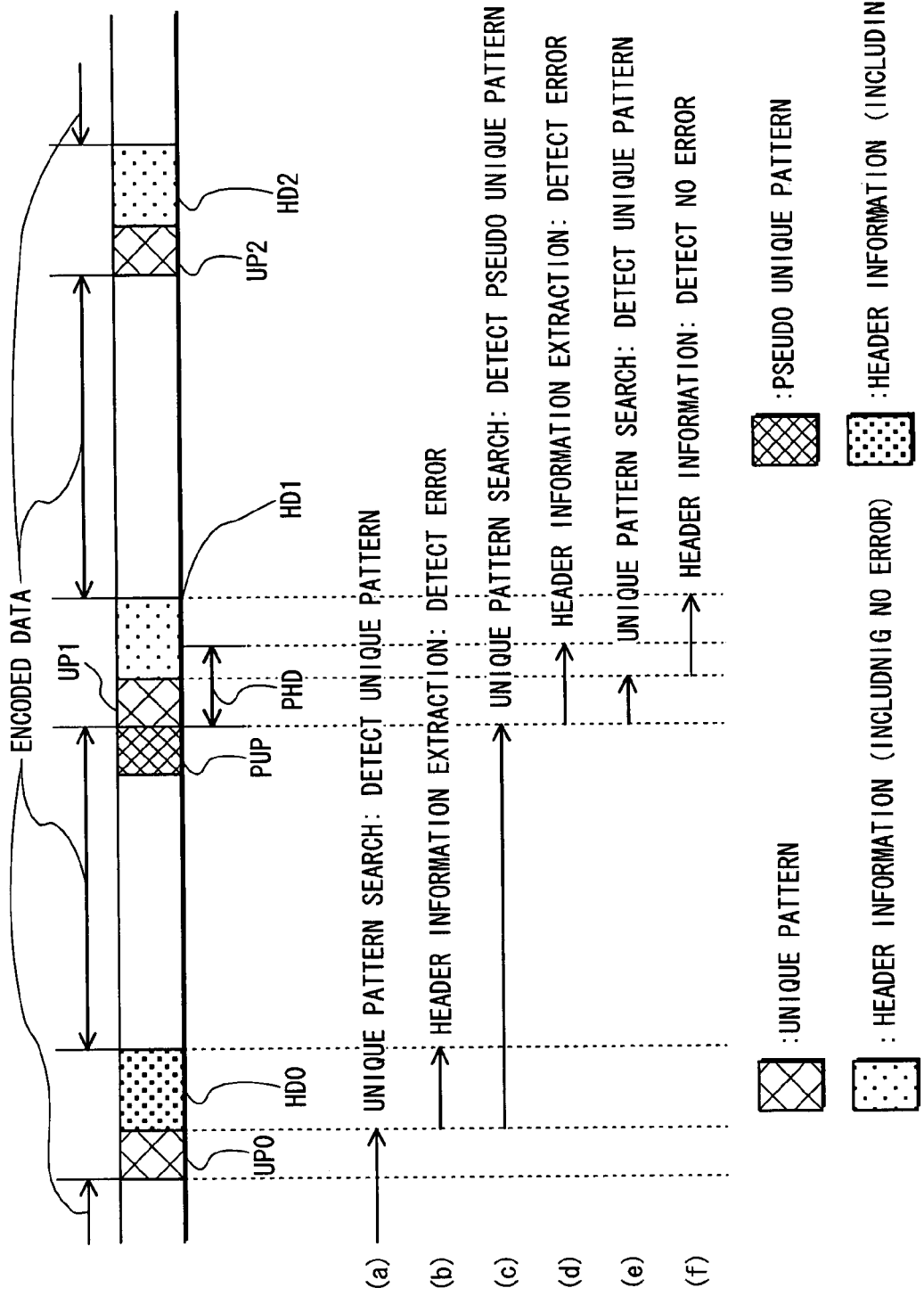
FIG. 4 explains example operations of demultiplexing performed by the demultiplexer of FIG. 1.
Figure 12:
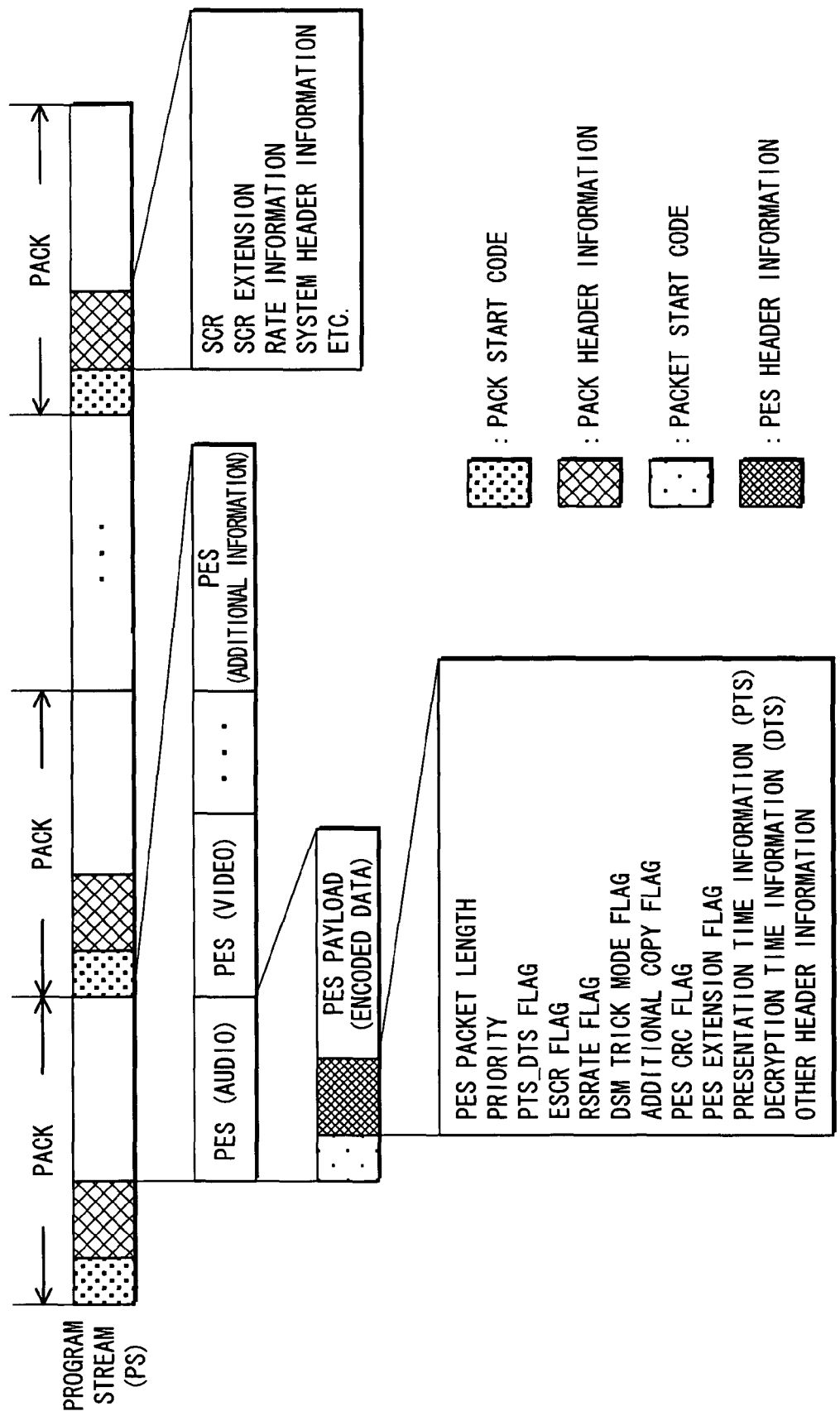
FIG. 12 shows an overall structure of multiplex data to be accumulated, based on a multiplexing system defined by the system standard of MPEG.

The following explains example operations of the demultiplexing performed by the demultiplexer 1, whose structure is shown in FIG. 1, with reference to FIG. 4. FIG. 4 explains example operations of demultiplexing performed by the demultiplexer of FIG. 1. It is assumed here that the multiplexed data shown in FIG. 4 is the same as that shown in FIG. 12.

(a) The unique pattern detection unit 103 conducts a search for the unique pattern in the forward direction of the program stream, and detects a pattern data sequence (the unique pattern UP0) that is the same as the unique pattern.

(b) The header information extraction unit 104 sets extraction starting position information to the extraction starting position storing unit 105. The extraction starting position information indicates a position of the head of a pattern subsequent data sequence that follows the detected unique pattern UP0. The position of the head is the position in the input buffer 101 indicated by the read pointer at the time when the header information extraction operation is started, i.e. a position of the head of header information HD0.

The header information extraction unit 104 extracts the header information HD0 from a pattern subsequent data sequence following the detected unique pattern UP0. The error checking unit 106 checks whether any error is included in the header information HD0, and detects an error of the header information HD0.

The demultiplex control unit 108 reconfigures the read pointer of the input buffer 101 so as to indicate the position indicated by the extraction starting position information stored in the extraction starting position storing unit 105.

(c) The unique pattern detection unit 103 conducts a search for the unique pattern in the forward direction of the program stream from a position of the head of a header subsequent data sequence following the header information HD0, and detects the pattern data sequence (the pseudo unique pattern PUP) that is the same as the unique pattern included in the encoded data.

(d) The header information extraction unit 104 sets extraction starting position information into the extraction starting position storing unit 105. The extraction starting position information indicates a position of the head of a pattern subsequent data sequence (head of pseudo header information PHD) following the detected pseudo unique pattern PUP.

The header information extraction unit 104 extracts the pseudo header information PHD from the pattern subsequent data sequence following the detected pseudo unique pattern PUP as the header information, and judges whether any error is included in the pseudo header information PHD. The pseudo unique pattern PUP is a data sequence in encoded data, but not the genuine unique pattern. Also, the pseudo header information PHD extracted from the pattern subsequent data sequence following the pseudo unique pattern PUP is not the genuine header information. For this reason, the error checking unit 106 detects an error of the pseudo header information PHD.

The demultiplex control unit 108 changes the position of the read pointer of the input buffer 101 to the position indicated by the extraction starting position information stored in the extraction starting positions storing unit 105.

(e) The unique pattern detection unit 103 conducts a search for the unique pattern in the forward direction of the program stream from a position of the head of the pseudo header information PHD, and detects a pattern data sequence (the unique pattern UP1) that is the same as the unique pattern. The unique pattern UP1 is the genuine unique pattern.

(f) The header information extraction unit 104 sets the extraction starting position information into the extraction starting position storing unit 105. The extraction starting position information indicates a position of the head of a pattern subsequent data sequence (a position of the head of header information PH1) following the detected unique pattern UP1.

The header information extraction unit 104 extracts the header information HD1 from the pattern subsequent data sequence following the detected unique pattern UP1. The error checking unit 106 checks whether any error is included in the header information HD1, and does not detect any error.

As described above, the demultiplexer 1 can detect the unique pattern UP1 which can not be detected by the conventional art whose example operations are shown in FIG. 13. As a result, it becomes possible to extract the header information including no error. For this reason, the demultiplexer 1 can realize earlier resumption of reproduction of audio, video, etc. compared with the conventional technology whose example operations are shown in FIG. 13.

<Advantageous Effects>

According to the above-described embodiment, in the case where any error is detected from the extraction header information, the operation for detecting the unique pattern is performed from the extraction starting position of the header information. Therefore, it is possible to detect the unique pattern even if the unique pattern is included in the extraction header information from which an error is detected and if part of the unique pattern is included in the end of the extraction header information.

Therefore, the ability of the detection of the unique pattern is improved compared to the conventional art that can not detect the unique pattern if the unique pattern is included in the extraction header information from which an error is detected, and if part of the unique pattern is included in the end of the extraction header information. As a result, the present embodiment can recover from an error more swiftly than the conventional art.

<Second Embodiment>

The following explains a demultiplexer according to a second embodiment of the present invention with reference to drawings.

In the first embodiment, the error check as to the header information following the unique pattern is necessarily performed without exception. In the second embodiment, on the other hand, as to the header information following the unique pattern, the error check is not performed as to the header information that does not include the presentation time information indicating that status is pre-recovery status. The pre-recovery status is described later.

<Structure>

Figure 5:
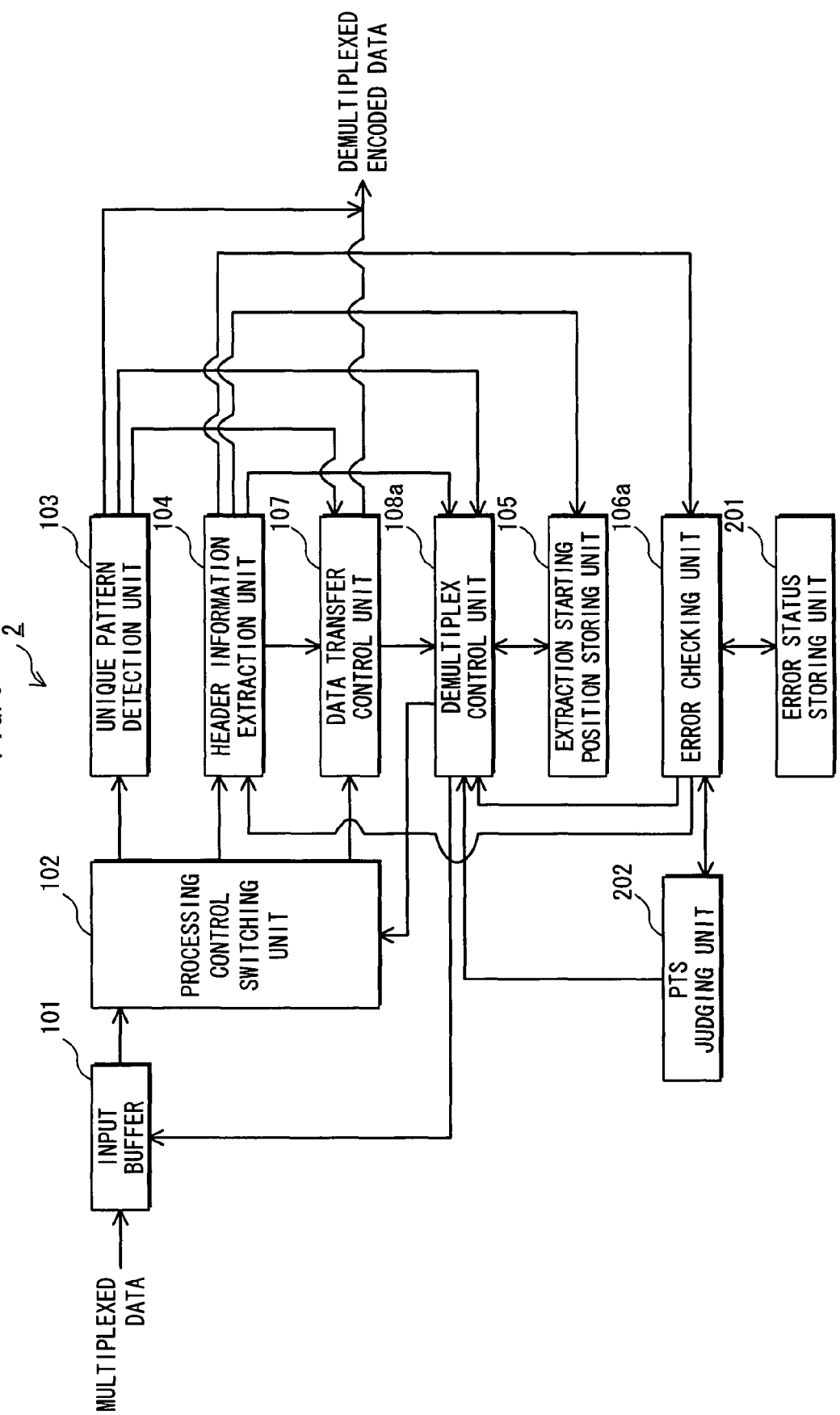
FIG. 5 shows a structure of a demultiplexer according to a second embodiment.

The following describes a structure of the demultiplexer according to the second embodiment, with reference to FIG. 5. FIG. 5 shows the structure of the demultiplexer according to the second embodiment. In this embodiment, components having substantially the same function as those of the first embodiment are referred to by the same reference numbers, and explanations thereof are omitted because the same explanations are applicable.

A demultiplexer 2 includes an input buffer 101, a processing control switching unit 102, a unique pattern detection unit 103, a header information extraction unit 104, an extraction starting position storing unit 105, an error checking unit 106a, a data transfer control unit 107, an error status storing unit 201, a PTS judging unit 202, and a demultiplex control unit 108a.

The error status storing unit 201 is a memory for storing an operation status of the demultiplexer 2. The error status storing unit 201 stores one of two statuses, namely a pre-recovery status and a normal status.

The pre-recovery status is a status of the demultiplexer 2 indicating that the demultiplexer 2 is in a period from when the error is detected by the error checking unit 106a from certain extraction header information until when it is judged that no error is included in extraction header information other than the certain extraction header information.

The normal status is a status of the demultiplexer 2 that is not in the pre-recovery status.

The error checking unit 106a refers to the operation status stored in the error status storing unit 201. If the status stored in the error status storing unit 201 is the normal status, the error checking unit 106a performs the following operations.

The error checking unit 106a checks whether any error is included in the extraction header information input from the header information extraction unit 104. If any error is detected from the extraction header information, the error checking unit 106a outputs the error detection notifying signal to the demultiplex control unit 108a to notify that that the error is detected, while setting the pre-recovery status to the error status storing unit 201. On the other hand, if no error is detected from the extraction header information, the error checking unit 106a sets the normal status to the error status storing unit 201 again.

If the status stored in the error status storing unit 201 is the pre-recovery status, the error checking unit 106a performs the following operations.

The error checking unit 106a outputs the extraction header information input from the header information extraction unit 104 to the PTS judging unit 202. As a response to this output, the error checking unit 106a receives PTS presence information from the PTS judging unit 202. The PTS presence information indicates whether the presentation time information (PTS) is included in the extraction header information.

If the PTS presence information indicates that the PTS is included in the extraction header information, the error checking unit 106a checks whether any error is included in the extraction header information input from the header information extraction unit 104. If any error is detected from the extraction header information, the error checking unit 106a outputs the error detection notifying signal to the demultiplex control unit 108a, while setting the pre-recovery status to the error status storing unit 201 again. On the other hand, if no error is detected from the extraction header information, the error checking unit 106a sets the normal status to the error status storing unit 201.

If the PTS presence information indicates that the PTS is not included in the extraction header information, the error checking unit 106a sets the pre-recovery status to the error status storing unit 201 again without performing the error check.

Note that the error check may also be performed as to the decoding time information and so on.

The PTS judging unit 202 receives the extraction header information from the error checking unit 106a, and judges whether the present time information PTS is included in the extraction header information.

If the PTS is not included in the extraction header information, the PTS judging unit 202 outputs the PTS presence information that indicates that the PTS is not included in the extraction header information to the error checking unit 106a while outputting a PTS non-detection notifying signal to the demultiplex control unit 108a to notify that the PTS is not included in the extraction header information.

On the other hand, if the PTS is included in the extraction header information, the PTS judging unit 202 outputs the PTS presence information that indicates that the PTS is included in the extraction header information to the error checking unit 106a.

The demultiplex control unit 108a performs the same processing as the demultiplex control unit 108 performs. In addition, upon receiving the PTS non-detection notifying signal from the PTS judging unit 202, the demultiplex control unit 108a outputs the unique pattern detection instructing signal to the processing control switching unit 102. At this time, the demultiplex control unit 108a reads the extraction starting position information from the extraction starting position storing unit 105, and changes the position of the read pointer of the input buffer 101 to the position in the input buffer 101 indicated by the extraction starting position information.

<Operations>

Figure 6:
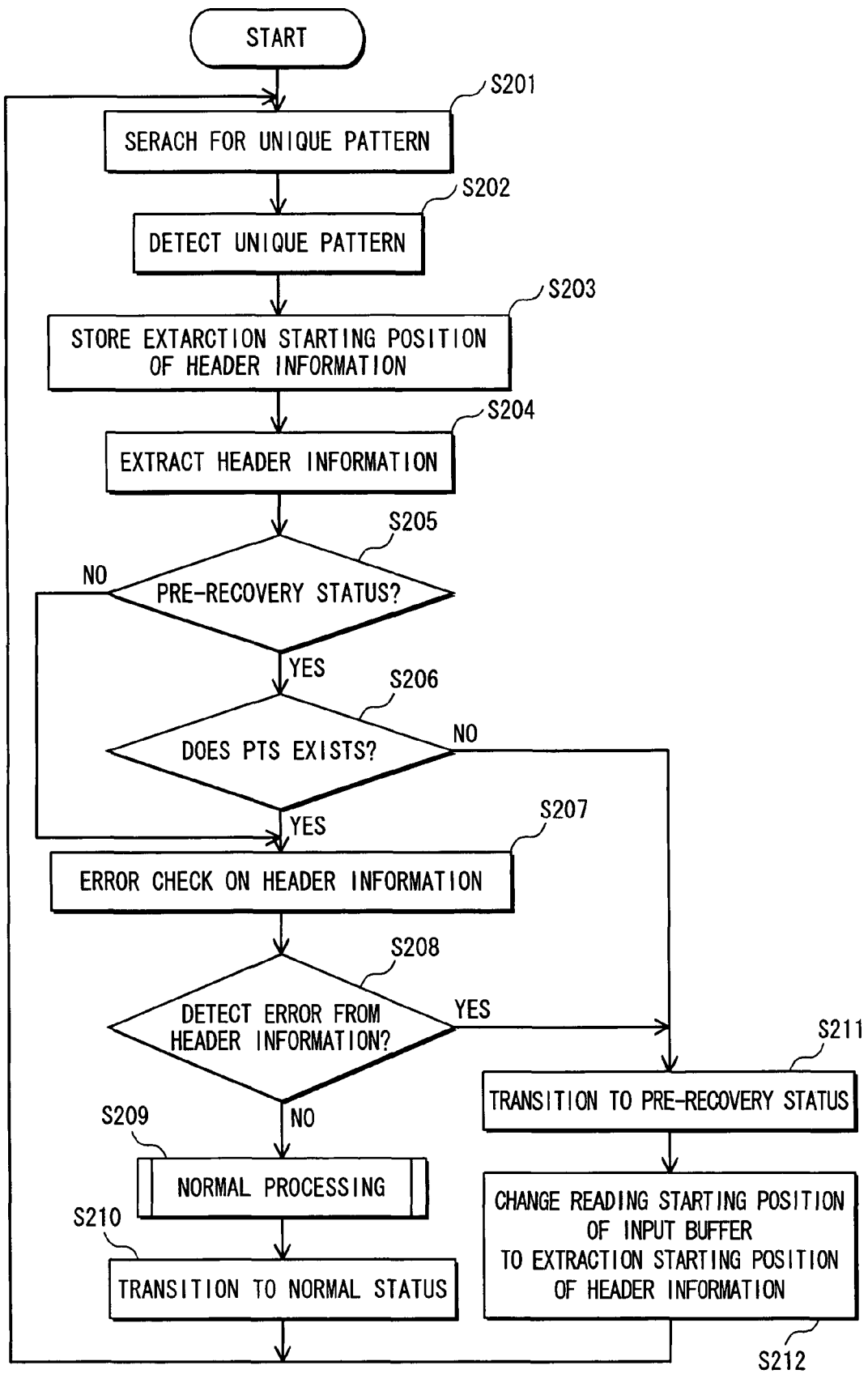
FIG. 6 is a flowchart showing a flow of demultiplexing performed by the demultiplexer of FIG. 5.

The following explains the demultiplexing performed by the demultiplexer 2, whose structure is shown in FIG. 5, with reference to FIG. 6. FIG. 6 is a flowchart showing a flow of the demultiplexing performed by the demultiplexer 2 of FIG. 5.

It is assumed here that the processing control switching unit 102 is currently connecting the output terminal of the input buffer 101 and the input terminal of the unique pattern detection unit 103. The error status storing unit 201 stores the normal status.

The demultiplexer 2 performs operations that are the same as Step S101 to Step S104 (Step S201 to Step S204).

Upon receiving the extraction header information from the header information extraction unit 104, the error checking unit 106a checks whether the error status storing unit 201 stores the pre-recovery status (Step S205).

In the checking step of Step S205, if it is judged that the pre-recovery status is not stored in the error status storing unit 201, in other words, that the normal status is stored in the error status storing unit 201 (Step S205: NO), the error checking unit 106a performs error check as to the extraction header information (Step S207).

In the error check as to the extraction header information performed in Step S207, the error checking unit 106a checks whether any error is detected from the extraction header information (Step S208).

If no error is detected in the checking step of Step S208 (Step S208: NO), the demultiplexer 2 performs the normal operations that are substantially the same as those performed in Step S107 (Step S209). Then, the error checking unit 106a sets the normal status to the error status storing unit 201 (Step S210). After Step S210 finishes, the output terminal of the input buffer 101 is connected to the input terminal of the unique pattern detection unit 103 by the processing control switching unit 102, and Step S201 and later are performed.

If any error is detected in the checking step of Step S208 (Step S208: YES), the error checking unit 106a outputs the error detection notifying signal to the demultiplex control unit 108a, and the demultiplex control unit 108a outputs the unique pattern detection instructing signal to the processing control switching unit 102. The processing control switching unit 102 changes the connection destination of the input terminal of the input buffer 101 from the input terminal of the header information extraction unit 104 to the input terminal of the unique pattern detection unit 103. The error checking unit 106a sets the pre-recovery status as the error status storing unit 201 (Step S211). The demultiplex control unit 108a reads the extraction starting position information from the extraction starting position storing unit 105, and changes the position of the read pointer of the input buffer 101 to the position in the input buffer 101 indicated by the extraction starting position information (Step S212). After that, Step S201 is performed.

In the checking step of Step S205, if it is judged that the pre-recovery status is stored in the error status storing unit 201 (Step S205: YES), the error checking unit 106a outputs the input extraction header information to the PTS judging unit 202, and the PTS judging unit 202 judges whether the PTS is included in the extraction header information (Step S206).

In the judgment of Step S206, if it is judged that the PTS is included in the extraction header information (Step S206: YES), the PTS judging unit 202 outputs the PTS presence information indicating that the PTS is included in the extraction header information to the error checking unit 106a. Then, Step S207 to Step S210 are performed, and after that, Step S201 and later are performed. Instead, Steps S207, S208, S211 and S212 are performed, and after that, Step S201 and later are performed.

In the judgment of Step S206, if it is judged that the PTS is not included in the extraction header information (Step S206: NO), the PTS judging unit 202 outputs the PTS non-detection notifying signal to the demultiplex control unit 108a, and the demultiplex control unit 108a outputs the unique pattern detection instructing signal to the processing control switching unit 102. The processing control switching unit 102 changes the connection destination of the input terminal of the input buffer 101 from the input terminal of the header information extraction unit 104 to the input terminal of the unique pattern detection unit 103. Then, Step S211 to Step S212 are performed, and after that Step 201 and later are performed.

<Advantageous Effects>

In the program stream (PS) of the MPEG standard, once an error is detected from the extraction header information, the demultiplexer 2 performs the error recovery operations based on the presentation time information in the extraction header information. In other words, in the pre-recovery status, if the extraction header information does not include the presentation time information, the demultiplexer 2 can not perform the error recovery operations even if the extraction header information does not include any error.

According to this embodiment of the present invention, in the case of the pre-recovery status, the error check as to the extraction header information is not performed if the extraction header information does not include the present time information. Therefore, no delay occurs as to the position in the program stream whose error is to be recovered, and this reduces load of the operations for the error check as to the extraction header information.

<Third Embodiment>

The following describes a demultiplexer according to a third embodiment of the present invention, with reference to drawings.

In the case where any error is detected from the extraction header information, to enable the detection of the unique pattern all or part of which is included in the extraction header information, the first embodiment conducts the search for the unique pattern from the head of the pattern subsequent data sequence (the head of the header information) following the pattern data sequence that is the same as the unique pattern.

On the other hand, in the third embodiment, the presence of the unique pattern or part of the unique pattern is detected by analyzing the extraction header information.

<Structure>

A structure of a demultiplexer of this embodiment is explained with reference to FIG. 7.

Figure 7:
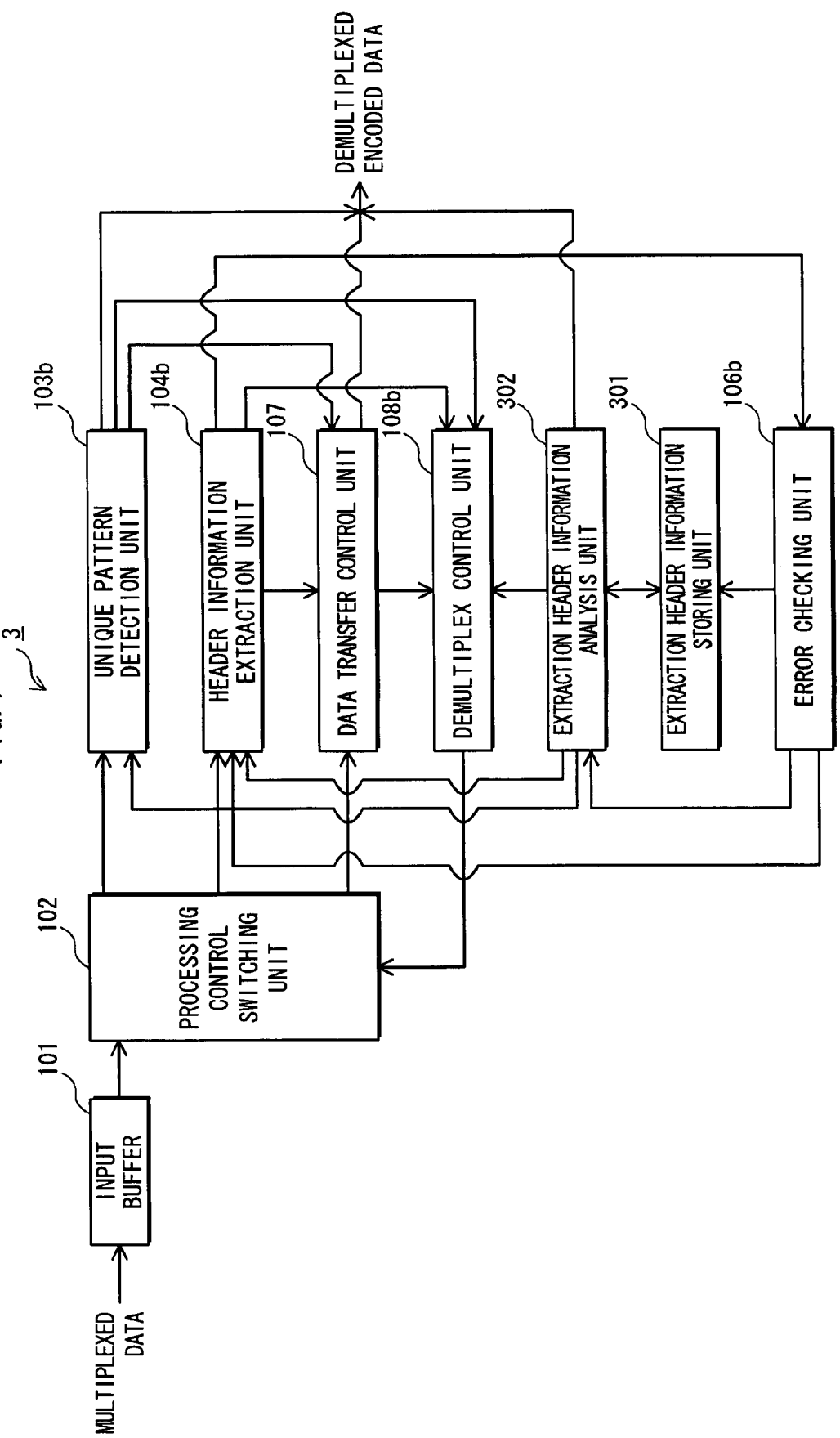
FIG. 7 shows a structure of a demultiplexer according to a third embodiment.

FIG. 7 shows a structure of a demultiplexer according to the third embodiment. In this embodiment, components having substantially the same function as those of the first embodiment are referred to by the same reference numbers, and explanations thereof are omitted because the same explanations are applicable.

A demultiplexer 3 includes an input buffer 101, a processing control switching unit 102, a unique pattern detection unit 103b, a header information extraction unit 104b, an error checking unit 106b, an extraction header information storing unit 301, an extraction header information analysis unit 302, a data transfer control unit 107, and a demultiplex control unit 108b.

If a detection status notifying signal described later is not input from the extraction header information analysis unit 302, and the output terminal of the input buffer 101 is connected to the input terminal of the unique pattern detection unit 103b, the unique pattern detection unit 103b sequentially reads pieces of data included in the multiplexed data sequence stored in the input buffer. 101, while conducting search operations for searching for the unique pattern from the read data sequence.

If the detection status notifying signal described later is input from the extraction header information analysis unit 302, and the output terminal of the input buffer 101 is connected to the input terminal of the unique pattern detection unit 103b, the unique pattern detection unit 103b conducts the search operations for searching for the unique pattern in the forward direction of the multiplexed data sequence, using the data sequence (part of the unique pattern: see FIG. 8) corresponding to the unique pattern detection status indicated by the detection status notifying signal and the pieces of data constituting the multiplexed data accumulated in the input buffer 101.

Operations to be performed after the unique pattern is detected are substantially the same as the operations performed by the unique pattern detection unit 103.

Here, the pieces of data which constitutes the multiplexed data sequence accumulated in the input buffer 101 is the data next to the last data read by the header information extraction unit 104b from the input buffer 101, and pieces of data subsequent to the data next to the last data. In this embodiment, unlike the first embodiment, the position of the read pointer of the input buffer 101 is not changed.

If new header information (the data sequence following the pattern data sequence that is the same as the unique pattern in the extraction header information) is not set by the extraction header information analysis unit 302 and the output terminal of the input buffer 101 is connected to the input terminal of the header information extraction unit 104b, the header information extraction unit 104b sequentially reads pieces of data (e.g. 5-byte data) constituting the multiplexed data sequence accumulated in the input buffer 101, while conducting the header information extraction operations for extracting the header information (e.g. the packet length, the flags, the header length, the present time information and so on) from the read pieces of data.

If the new header information is input by the extraction header information analysis unit 302, the header information extraction unit 104b sets the new header information to the head of the data sequence as the header information extraction target. The header information extraction unit 104b conducts, from the beginning, the extraction operations for extracting the header information in units of five bytes in the forward direction of the multiplexed data sequence, using the set new header information and the data constituting the multiplexed data sequence accumulated in the input buffer 101.

Note that the output from the header extraction unit 104b is substantially the same as the output from the header information extraction unit 104, except for the output of the extraction starting position information to the extraction starting position storing unit 105.

The error checking unit 106b performs the error check as to the extraction header information input from the header information extraction unit 104b, and sets the input extraction header information to the extraction header information storing unit 301. If any error is detected from the extraction header information, the error checking unit 106b outputs the error detection notifying signal to the extraction header information analysis unit 302 to notify that the error of the extraction header information is detected. Note that the error check may also be performed as to other information such as the decoding time information.

The extraction header information storing unit 301 is a memory for storing the extraction header information. The extraction header information stored in the extraction header information storing unit 301 is data following the unique pattern most recently detected by any of the unique pattern detection unit 103 and the extraction header information analysis unit 302, and is all the data read from the input buffer 101.

Upon receiving the error detection notifying signal from the error checking unit 106b, the extraction header information analysis unit 302 reads all the extraction header information stored in the extraction header information storing unit 301.

The extraction header information analysis unit 302 analyzes the data sequence (hereinafter called the "extraction header data sequence") constituted of the read extraction header information to judge whether the pattern data sequence that is the same as the unique pattern is included in the extraction header data sequence. If the pattern data sequence is included in the extraction header data sequence, the extraction header information analysis unit 302 outputs the data sequence (the new header information) following the pattern data sequence included in the extraction header sequence to the header information extraction unit 104b.

The extraction header information analysis unit 302 checks whether the end portion of the extraction header data sequence that is the same as part of the high order of the unique pattern. If the end portion is the same as the part, the extraction header information analysis unit 302 outputs the detection state notifying signal for notifying the unique pattern detection state that indicates the data contents that is the same as the part of the unique pattern, to the unique pattern detection unit 103b. At the same time, the extraction header information analysis unit 302 outputs the unique pattern part detection notifying signal for notifying that the end portion of the extraction header data sequence that is the same as part of the unique pattern, to the demultiplex control unit 108b.

If the pattern data sequence is not included in the extraction header data sequence, and the end portion of the extraction header data sequence that is not the same as part of the unique pattern, the extraction header information analysis unit 302 outputs the unique pattern non-detection notifying signal for notifying that the data sequence relating to the unique pattern could not be detected, to the demultiplex control unit 108b.

The following explains the unique pattern detection status, with reference to FIG. 8. FIG. 8 explains the unique pattern detection status.

It is assumed that the unique pattern is "00-00-01-ID". The ID is an identifier for identifying the pack, or the type of the encoded data (the video, the audio, the additional information, and so on) inserted in the PES payload.

If the end portion of the data sequence including the extraction header information is "00" and it is not "00-00", the unique pattern detection status is a unique pattern detection status (1) that indicates that the content that is the same as the unique pattern is "00".

If the end portion of the data sequence including the extraction header information is "00-00" and it is not "00-00-01", the unique pattern detection status is a unique pattern detection status (2) that indicates that the content that is the same as the unique pattern is "00-00".

If the end portion of the data sequence including the extraction header information is "00-00-01" and it is not "00-00-01-ID", the unique pattern detection status is a unique pattern detection status (3) that indicates that the content that is the same as the unique pattern is "00-00-01".

Upon receiving the unique pattern detection notifying signal from the unique pattern detection unit 103b, the demultiplex control unit 108b outputs the header information extraction instructing signal to the processing control switching unit 102.

Upon receiving any of the unique pattern part detection notifying signal and the unique pattern non-detection notifying signal from the extraction header information analysis unit 302, the demultiplex control unit 108b outputs the unique pattern detection instructing signal to the processing control switching unit 102.

In the case where the pack-PES notifying signal input from the unique pattern detection unit 103b indicates the PES, upon receiving the read completion notifying signal from the header information extraction unit 104, the demultiplex control unit 108b outputs the data transfer control instructing signal to the processing control switching unit 102.

In the case where the pack-PES notifying signal input from the unique pattern detection unit 103b indicates the pack, upon receiving the read completion notifying signal from the header information extraction unit 104, the demultiplex control unit 108b outputs the unique pattern detection instructing signal to the processing control switching unit 102.

Upon receiving the transfer completion notifying signal from the data transfer control unit 107, the demultiplex control unit 108b outputs the unique pattern detection instructing signal to the processing control switching unit 102.

<Unique Pattern Search Operation of the Case Where Unique Pattern Detection Status is Set>

Figure 9:
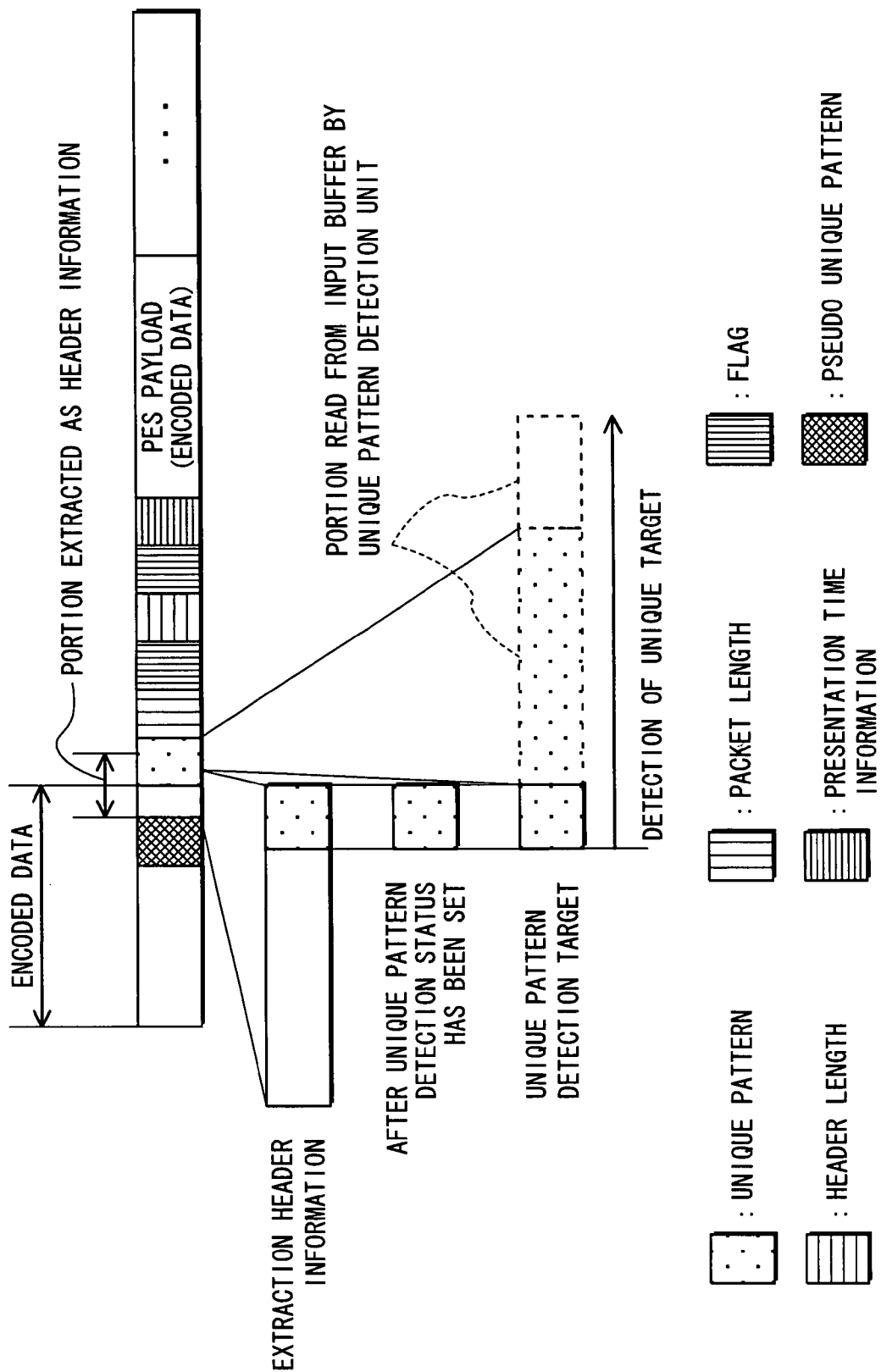
FIG. 9 explains operations for searching for the unique pattern when a unique pattern detection status is set up.

The following explains the unique pattern search operations performed by the unique pattern detection unit 103b when the unique pattern detection status is set, with reference to FIG. 9. FIG. 9 explains the operations for searching for the unique pattern when the unique pattern detection status is set up.

The extraction header information analysis unit 302 analyzes the data sequence including the extraction header information (extraction header data sequence), and confirms that the unique pattern data sequence that is the same as the unique pattern is not included in the extraction header data sequence, but the end portion of the extraction header data sequence is the same as the part of the unique pattern.

The extraction header information analysis unit 302 outputs the detection status notifying signal to the unique pattern detection unit 103b to notify the unique pattern detection status. The unique pattern detection unit 103b sets the data sequence in accordance with the unique pattern detection status to the head of the data sequence as the unique pattern search target. For example, if the unique pattern detection status indicated by the detection status notifying signal is the unique pattern detection status (1), the unique pattern detection unit 103b sets "00" to the head of the data sequence as the unique pattern search target.

The unique pattern detection unit 103b sequentially reads the pieces of data constituting the multiplexed data sequence accumulated in the input buffer 101, and conducts the search for the unique pattern while sequentially adding the read data to the data sequence as the unique pattern search target.

<Operations for Extracting Header Information When New Header Information is Set>

Figure 10:
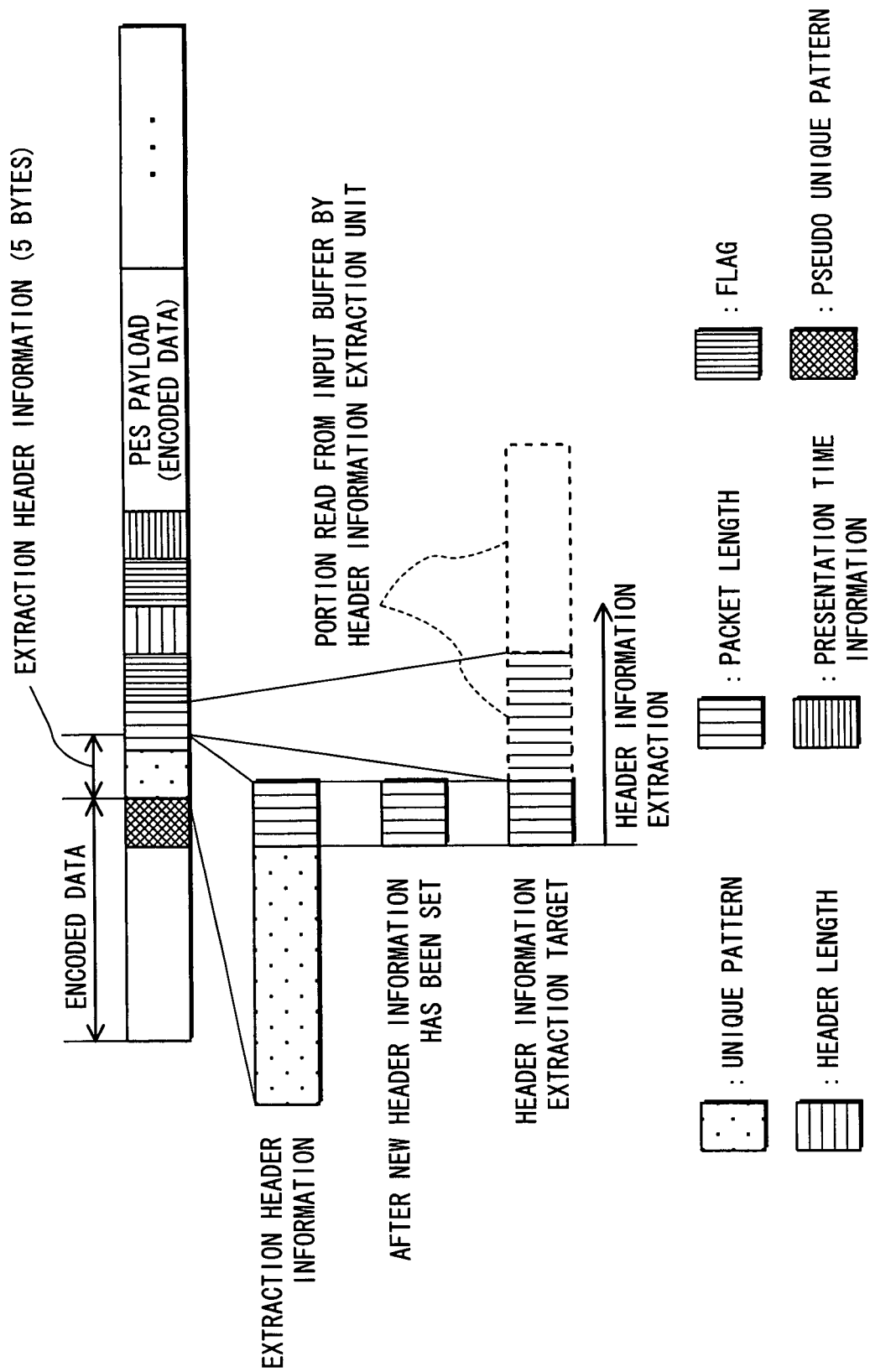
FIG. 10 explains operations for setting new header information.

The following explains the operations for extracting the header information performed by the header information extraction unit 104b when the new header information is set, with reference to FIG. 10. FIG. 10 explains the operations for extracting the header information when the new header information is set.

The extraction header information analysis unit 302 analyzes the data sequence including the extraction header information (extraction header data sequence), and detects the pattern data sequence that is the same as the unique pattern included in the extraction header data sequence.

The extraction header information analysis unit 302 outputs the data sequence (new header information) following the pattern data sequence included in the extraction header data sequence to the header information extraction unit 104b. The header information extraction unit 104b sets the new header information to the head of the data sequence as the header information extraction target.

The header information extraction unit 104b sequentially reads pieces of data constituting the multiplexed data accumulated in the input buffer 101, and conducts the extraction of the header information while sequentially adding the read data to the data sequence as the header information extraction target.

<Operations>

Figure 11:
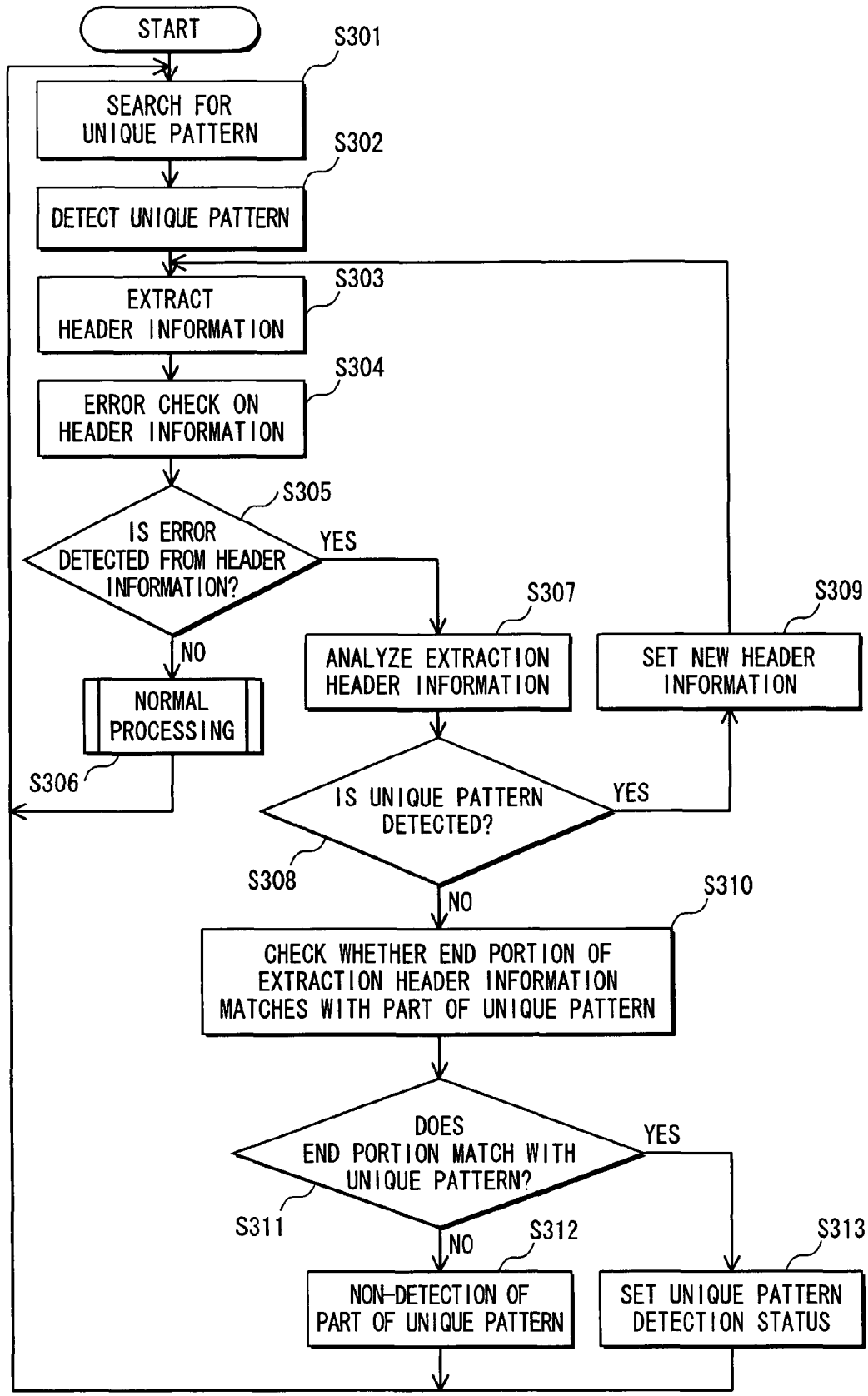
FIG. 11 is a flowchart showing a flow of demultiplexing performed by the demultiplexer of FIG. 7.

The demultiplexing performed by the demultiplexer 3 whose structure is shown in FIG. 7 is explained with reference to FIG. 11. FIG. 11 is a flowchart showing a flow of the demultiplexing performed by the demultiplexer 3 of FIG. 7

It is assumed here that when the demultiplexing shown in FIG. 11 starts, the processing control switching unit 102 is connecting the output terminal of the input buffer 101 and the input terminal of the unique pattern detection unit 103b, and the error status storing unit 301 stores the normal status.

The unique pattern detection unit 103b conducts the search for the unique pattern (Step S301) and detects the unique pattern included in the multiplexed data sequence (Step S302).

The header information extraction unit 104b conducts the extraction of the header information (Step S303), and the error checking unit 106b checks whether any error is included in the extracted header information (the extraction header information) (Step S304).

In the error check as to the extraction header information performed in Step S304, the error checking unit 106b checks whether any error is detected from the extraction header information (Step S305). If no error is detected from the extraction header information (Step S305: NO), the demultiplexer 3 performs the operations (the normal operations) that are substantially the same as the operations performed in Step S107 (Step S305), and performs Step S301 and later.

In the error check as to the extraction header information performed in Step S305, if any error is detected from the extraction header information (Step S305: YES), the demultiplexer 3 performs reads the extraction header information stored in the extraction header information storing unit 301, analyzes the data sequence (the extraction header data sequence) constituted of the read extraction header information, and searches for the pattern data sequence that is the same as the unique patter from the extraction header data sequence (Step S307).

If the pattern data sequence that is the same as the unique pattern is detected from the extraction header data sequence (Step S308: YES), the extraction header information analyzing unit 302 outputs the data sequence (the new header information) following the pattern data sequence in the extraction header data sequence to the header information extraction unit 104b. Then, the header information extraction unit 302 sets the new header information to the head of the data sequence as the header information extraction target (Step S309). Then, Step S303 and later are performed.

If the pattern data sequence that is the same as the unique pattern is not detected from the extraction header data sequence (Step S308: NO), the extraction header information analysis unit 302 checks whether the end portion of the extraction header data sequence that is the same as part of the high order of the unique pattern (Step S310).

As a result of the check, if the end portion of the extraction header data sequence is not the same as part of the high order of the unique pattern (Step S311: NO), the extraction header information analysis unit 302 can not extract part of the unique pattern from the end portion of the extraction header data sequence, and outputs the unique pattern non-detection notifying signal to the demultiplex control unit 108b. The demultiplex control unit 108b outputs the unique pattern detection instructing signal to the processing control switching unit 102, and the processing control switching unit 102 connects the output terminal of the input buffer 101 to the input terminal of the unique pattern detection unit 103b (Step S312). Then, Step S301 and later are performed.

As a result of the check, if the end portion of the extraction header data sequence is the same as part of the high order of the unique pattern (Step S311: YES), the extraction header information analysis unit 302 outputs the detection status notifying signal for notifying the unique pattern detection status indicating contents of the data that is the same as the unique pattern to the unique pattern detection unit 103b, and the unique pattern detection unit 103b sets data sequence corresponding to the unique pattern detection status to the had of the data sequence as the unique pattern detection target. Also, the extraction header information analysis unit 302 outputs the unique pattern part detection notifying signal to the demultiplex control unit 108b, and the demultiplex control unit 108b outputs the unique pattern detection instructing signal to the processing control switching unit 102. The processing control switching unit 102 connects the output terminal of the input buffer 101 to the input terminal of the unique pattern detection unit 103b (Step S313). Then, Step S301 and later are performed.

Note that data other than the part of the unique pattern included in the extraction header data sequence may be output to the subsequent output buffer (not illustrated) or abandoned.

<Advantageous Effects>

According to the third embodiment described above, unlike the first embodiment, it is unnecessary to prepare a mechanism for changing the position of the read pointer of the input buffer to the position in the input buffer indicated by the extraction starting position information. Therefore, it is possible to make the control mechanism for the input buffer simpler compared with the first embodiment.

Also, the ability of the detection of the unique pattern is improved in the same manner as the first embodiment. As a result, the present embodiment can recover from an error more swiftly than the conventional art.

<Supplemental Explanations>

The present invention is not limited to the embodiments above. For example, the following are included in the present invention.

(1) In the embodiments above, the subject data is the program stream (PS) in conformity with the MPEG standard. However, the present invention is not limited to this. Any data may be the subject data as long as the data in which a data blocks each including the unique pattern, the header information following the unique pattern and the data body following the header information are continuously arranged, such as a transport stream (TS) in conformity with the MPEG standard.

(2) In the embodiments above, the unique pattern includes the ID. However, the unique pattern may not include the ID.

(3) The function of performing the error check as to the extraction header information in the case of the pre-recovery status only when the extraction header includes the presentation time information, which is described in the second embodiment, may be applied to the demultiplexer of the third embodiment.

For example, operations substantially the same as Step S205 and S206 may be added between Step S303 and Step S304 in FIG. 11. If this is the case, operations substantially the same as Step S211 may be added as the destination of "NO" of the added Step S206 and the destination of "YES" of the Step S305, and Step S307 is to be performed after Step S211 is performed. Moreover, operations substantially the same as Step S210 is to be performed after Step S306 is performed.

(4) In the second embodiment above, the extraction and the error check of the header information is performed in units of five bytes. However the present invention is not limited to this. The processing may be performed in units of prescribed length of bytes, such as units of two bytes and units of six bytes.

(5) The present invention may be a data demultiplexing method for performing processing equivalent to all or part of the components of the demultiplexer described in the embodiments.

Also, a program describing the processing equivalent to all or part of the processing performed by the demultiplexer explained in the embodiments above may be stored in a memory and the program may be executed by a CPU or the like.

(6) Note that the present invention may be applied to a digital reproduction apparatus that reproduces multiplexed data stored in a recording medium such as an SD (Secure Digital) memory card and a DVD. Also, the present invention may be applied to a digital television, and a mobile telephone and so on that can receive a digital broadcast.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data analysis apparatus comprising:
a unique pattern detection unit configured to conduct a search for a pattern data sequence in a forward direction of a data sequence constituted of successive data blocks each including a unique pattern, header information following the unique pattern and a data body following the header information, the pattern data sequence being the same as the unique pattern;
an extraction unit configured to extract header information from a subsequent data sequence following the pattern data sequence detected by the search;
an extraction starting position storing unit configured to store extraction starting position information indicating a position of a head of the header information of the subsequent data sequence wherein the extraction starting position storing unit is a memory device which is inside of the data analysis apparatus;
an error checking unit configured to conduct an error check on extraction header information that is the header information extracted by the extraction unit; and
a control unit configured, if any error is detected from the extraction header information by the error checking unit, to cause the unique pattern detection unit to resume the search for the pattern data sequence from the position of the head of the header information indicated by the extraction starting position information stored in the extraction starting position storing unit,
wherein the extraction starting position storing unit stores the extraction starting position information before the error checking unit conducts the error check.

2. A data analysis apparatus comprising:
a unique pattern detection unit configured to conduct a search for a pattern data sequence in a forward direction of a data sequence constituted of successive data blocks each including a unique pattern, header information following the unique pattern and a data body following the header information, the pattern data sequence being the same as the unique pattern;
an extraction unit configured to extract header information from a subsequent data sequence following the pattern data sequence detected by the search;
an extraction starting position storing unit configured to store extraction starting position information indicating a position of a head of the header information of the subsequent data sequence wherein the extraction starting position storing unit is a memory device which is inside of the data analysis apparatus;
an error checking unit configured to conduct an error check on extraction header information that is the header information extracted by the extraction unit;
a control unit configured, if any error is detected from the extraction header information by the error checking unit, to cause the unique pattern detection unit to resume the search for the pattern data sequence from the position of the head of the header information indicated by the extraction starting position information stored in the extraction starting position storing unit; and
a status storing unit configured to store a pre-recovery status information indicating that a current period is a pre-recovery period that is from when an error is detected from a certain extraction header information by the error checking unit until when no error is detected from other header information following the certain extraction header information; and
an information judging unit configured to judge whether prescribed information is included in the extraction header information,
wherein only if the status storing unit does not store the pre-recovery status information or if the status storing unit stores the pre-recovery status information and the information judging unit has judged affirmatively, the error checking unit conducts the error check on the extraction header information, and only if the error checking unit has detected any error from the extraction header information or if the status storing unit stores the pre-recovery status information and the information judging unit has judged negatively, the control unit causes the unique pattern detection unit to resume the search for the pattern data sequence that is the same as the unique pattern from the position indicated by the extraction starting position information.

3. A data analysis apparatus comprising:

a unique pattern detection unit configured to conduct a search for a pattern data sequence in a forward direction of a data sequence constituted of successive data blocks each including a unique pattern, header information following the unique pattern and a data body following the header information, the pattern data sequence being the same as the unique pattern;

an extraction unit configured to extract header information from a subsequent data sequence following the pattern data sequence detected by the search;

an extraction starting position storing unit configured to store extraction starting position information indicating a position of a head of the header information of the subsequent data sequence;

an error checking unit configured to conduct an error check on extraction header information that is the header information extracted by the extraction unit;

a control unit configured, if any error is detected from the extraction header information by the error checking unit, to cause the unique pattern detection unit to resume the search for the pattern data sequence from the position of the head of the header information indicated by the extraction starting position information;

a status storing unit configured to store a pre-recovery status information indicating that a current period is a pre-recovery period that is from when an error is detected from a certain extraction header information by the error checking unit until when no error is detected from other header information; and an information judging unit configured to judge whether prescribed information is included in the extraction header information, wherein only if the status storing unit does not store the pre-recovery status information or if the status storing unit stores the pre-recovery status information and the information judging unit has judged affirmatively, the error checking unit conducts the error check on the extraction header information, and only if the error checking unit has detected any error from the extraction header information or if the status storing unit stores the pre-recovery status information and the information judging unit has judged negatively, the analysis unit analyzes the extraction header information.

4. A data analysis method performed by a data analysis apparatus, the method comprising:

a search step of conducting, by the data analysis apparatus, a search for a pattern data sequence in a forward direction of a data sequence constituted of successive data blocks each including a unique pattern, header information following the unique pattern and a data body following the header information, the pattern data sequence being the same as the unique pattern;

an extraction step of extracting header information from a subsequent data sequence following the pattern data sequence detected by the search;

an extraction starting position storing step of storing extraction starting position information indicating a position of a head of the header information of the subsequent data sequence wherein the extraction starting position information is stored in a memory device which is inside of the data analysis apparatus;

an error checking step of conducting an error check on extraction header information that is the header information extracted in the extraction step; and a control step of, if any error is detected from the extraction header information in the error checking step, resuming the search in the search step for the pattern data sequence from the position of the head of the header information indicated by the extraction starting position information stored in the memory device by the extraction starting position storing step, wherein in the extraction starting position storing step, the extraction starting position information is stored before the error check is conducted in the error checking step.

5. A data analysis method performed by a data analysis apparatus, the method comprising:

a search step of conducting, by the data analysis apparatus, a search for a pattern data sequence in a forward direction of a data sequence constituted of successive data blocks each including a unique pattern, header information following the unique pattern and a data body following the header information, the pattern data sequence being the same as the unique pattern;

an extraction step of extracting header information from a subsequent data sequence following the pattern data sequence;

an error checking step of conducting an error check on extraction header information that is the header information extracted in the extraction step;

an analysis step of analyzing the extraction header information if any error has been detected from the extraction header information in the error checking step;

a first control step of, if the extraction header information includes the pattern data sequence that is the same as the unique pattern, extracting, in the extraction step, header information from a first subsequent data sequence following the pattern data sequence included in the extraction header information and a second subsequent data sequence following the extraction header information extracted in the extraction step;

a second control step of, if an end portion of the extraction header information is the same as a part of the unique pattern, conducting the search in the search step on the end portion and the second subsequent data sequence;

a status storing step of storing a pre-recovery status information indicating that a current period is a pre-recovery period that is from when an error is detected from a certain extraction header information by the error checking step until when no error is detected from other header information; and an information judging step of judging whether prescribed information is included in the extraction header information, wherein only if in the status storing step, the pre-recovery status information is not stored or if in the status storing step, the pre-recovery status information is stored and the information judging step has judged affirmatively, the error check is conducted in the error checking step on the extraction header information, and only if in the error checking step, any error has been detected from the extraction header information or if in the status storing step, the pre-recovery status information is stored and the information judging step has judged negatively, the extraction header information is analyzed in the analysis step.

* * * * *